United States Patent
Kondo et al.

(10) Patent No.: US 10,868,744 B2
(45) Date of Patent: Dec. 15, 2020

(54) INFLUENCE RANGE IDENTIFICATION METHOD AND INFLUENCE RANGE IDENTIFICATION APPARATUS

(71) Applicant: FUJITSU LIMITED, Kawasaki (JP)

(72) Inventors: Reiko Kondo, Yamato (JP); Hiroshi Otsuka, Kawasaki (JP); Yukihiro Watanabe, Kawasaki (JP); Masahiro Asaoka, Kawasaki (JP); Ken Yokoyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/987,960

(22) Filed: May 24, 2018

(65) Prior Publication Data

US 2018/0351840 A1 Dec. 6, 2018

(30) Foreign Application Priority Data

May 30, 2017 (JP) ................................ 2017-106651

(51) Int. Cl.
*H04L 12/26* (2006.01)
*H04L 12/24* (2006.01)

(52) U.S. Cl.
CPC ........ *H04L 43/0817* (2013.01); *H04L 41/065* (2013.01); *H04L 41/12* (2013.01); *H04L 41/147* (2013.01); *H04L 43/067* (2013.01); *H04L 41/0686* (2013.01)

(58) Field of Classification Search
CPC ... H04L 43/0817; H04L 41/065; H04L 41/12; H04L 41/147; H04L 43/067; H04L 41/0686

USPC ......................................................... 709/224
See application file for complete search history.

(56) References Cited

U.S. PATENT DOCUMENTS

| | | | |
|---|---|---|---|
| 9,537,720 B1 * | 1/2017 | Baggott | H04L 41/12 |
| 10,505,793 B2 * | 12/2019 | Yin | H04L 41/0695 |
| 2008/0034258 A1 * | 2/2008 | Moriya | G05B 19/4184 714/57 |
| 2014/0064056 A1 * | 3/2014 | Sakata | H04L 41/00 370/216 |

(Continued)

FOREIGN PATENT DOCUMENTS

| | | |
|---|---|---|
| JP | 2005-234861 | 9/2005 |
| JP | 2011-113122 | 6/2011 |

(Continued)

*Primary Examiner* — Tonia L Dollinger
*Assistant Examiner* — Schquita D Goodwin
(74) *Attorney, Agent, or Firm* — Fujitsu Patent Center

(57) ABSTRACT

An influence range identification apparatus includes a processor configured to acquire information indicating a first device in which a failure occurs. The processor searches for second devices starting from the first device based on a connection relationship among a plurality of devices. The second devices exist in a first influence range. The processor determines whether a third device exists among the second devices. The third device has abnormality due to the failure. The processor determines whether each of the second devices other than the third device exits in a second influence range starting from the third device based on the connection relationship among the second devices. The processor determines a rank of a degree of a possibility of being affected by the failure with respect to each of the second devices other than the third device.

6 Claims, 37 Drawing Sheets

(56) References Cited

U.S. PATENT DOCUMENTS

| | | | | |
|---|---|---|---|---|
| 2014/0298113 | A1* | 10/2014 | Sakurai | G06F 11/2025 |
| | | | | 714/47.3 |
| 2015/0103643 | A1* | 4/2015 | Fujioka | H04L 41/0668 |
| | | | | 370/218 |
| 2015/0334007 | A1* | 11/2015 | Miyoshi | H04L 45/28 |
| | | | | 370/216 |
| 2017/0126472 | A1* | 5/2017 | Margalit | G06Q 50/10 |
| 2017/0134240 | A1* | 5/2017 | Hevizi | H04L 41/065 |
| 2018/0196708 | A1* | 7/2018 | Amano | G06F 11/0709 |
| 2018/0295029 | A1* | 10/2018 | Shivanna | H04L 67/322 |
| 2018/0300041 | A1* | 10/2018 | Tilikin | G06F 16/84 |
| 2018/0367368 | A1* | 12/2018 | Schulz | G05B 19/4185 |

FOREIGN PATENT DOCUMENTS

| | | | |
|---|---|---|---|
| JP | 2013-206047 | | 10/2013 |
| JP | 2014178865 A | * | 9/2014 |
| JP | 2015-022396 | | 2/2015 |

* cited by examiner

FIG.14

43 INFLUENCE RANGE SEARCH ROUTE INFORMATION

43a FAILURE/SEARCH ROUTE CORRESPONDENCE TABLE

| FAILURE TYPE \ FUNCTION OF DEVICE | VM | Data store | RAID | HV | ... |
|---|---|---|---|---|---|
| DISK RELATED FAILURE | SEARCH ROUTE #1 | SEARCH ROUTE #3 | ... | - | ... |
| CPU RELATED FAILURE | SEARCH ROUTE #2 | - | - | ... | ... |
| ⋮ | ⋮ | ⋮ | ⋮ | ⋮ | ⋮ |

43b SEARCH ROUTE INFORMATION

- SEARCH ROUTE #1 : VM→Datastore→RAID→Datastore→VM
- SEARCH ROUTE #2 : VM→HV→VM
  ⋮

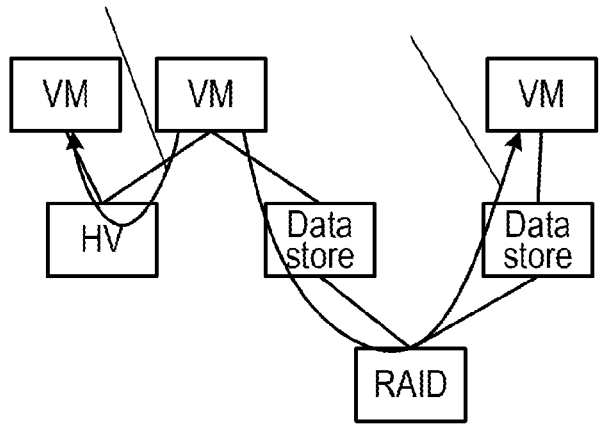

SEARCH ROUTE #2         SEARCH ROUTE #1

FIG.32

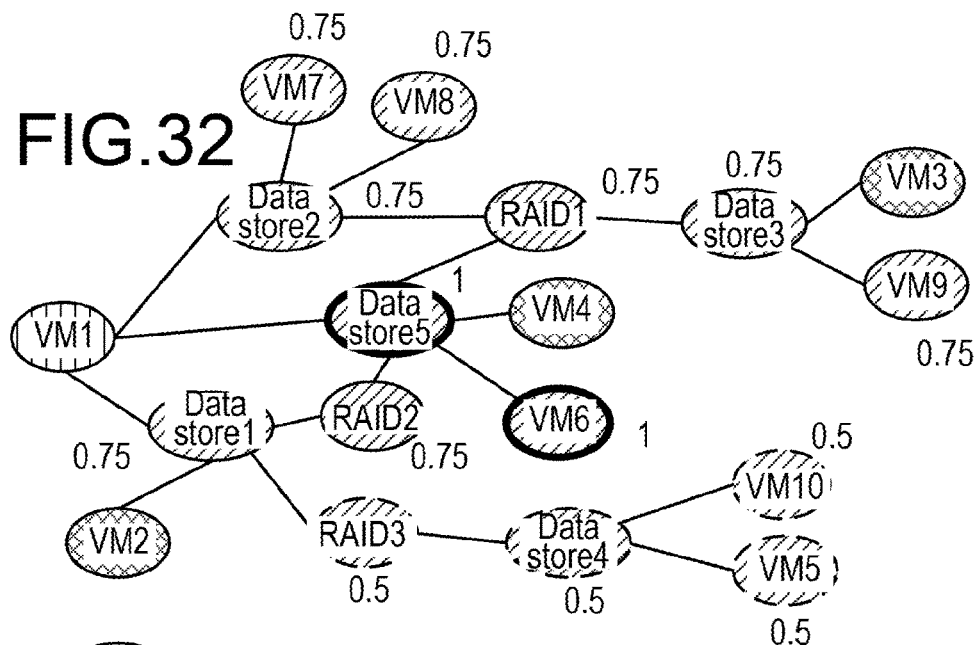

 FAILURE OCCURRENCE DEVICE

 ABNORMALITY OCCURRENCE DEVICE

 FAILURE AFFECTED DEVICE RANKING 1 (INFLUENCE DEGREE)

 FAILURE AFFECTED DEVICE RANKING 2 (INFLUENCE DEGREE)

 FAILURE AFFECTED DEVICE RANKING 3 (INFLUENCE DEGREE)

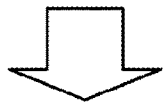

```
                                                              71
INFLUENCE RANGE MODEL

DEVICE       FUNCTION    DEVICE TYPE                    SCORE   RANK
VM1          vm          FAILURE OCCURRENCE DEVICE       -       -
Datastore1   datastore   FAILURE AFFECTED DEVICE         0.75    2
VM2          vm          ABNORMALITY OCCURRENCE DEVICE   -       -
VM5          vm          FAILURE AFFECTED DEVICE         0.5     3
VM6          vm          FAILURE AFFECTED DEVICE         1       1
  :            :            :

DEVICE NAME  DEVICE NAME
VM1          Datastore1
Datastore1   VM2
  :            :
```

CONNECTION INFORMATION

CONNECTION INFORMATION

FIG.36
SEARCH INFLUENCE RANGE OF FAILURE OCCURRENCE DEVICE
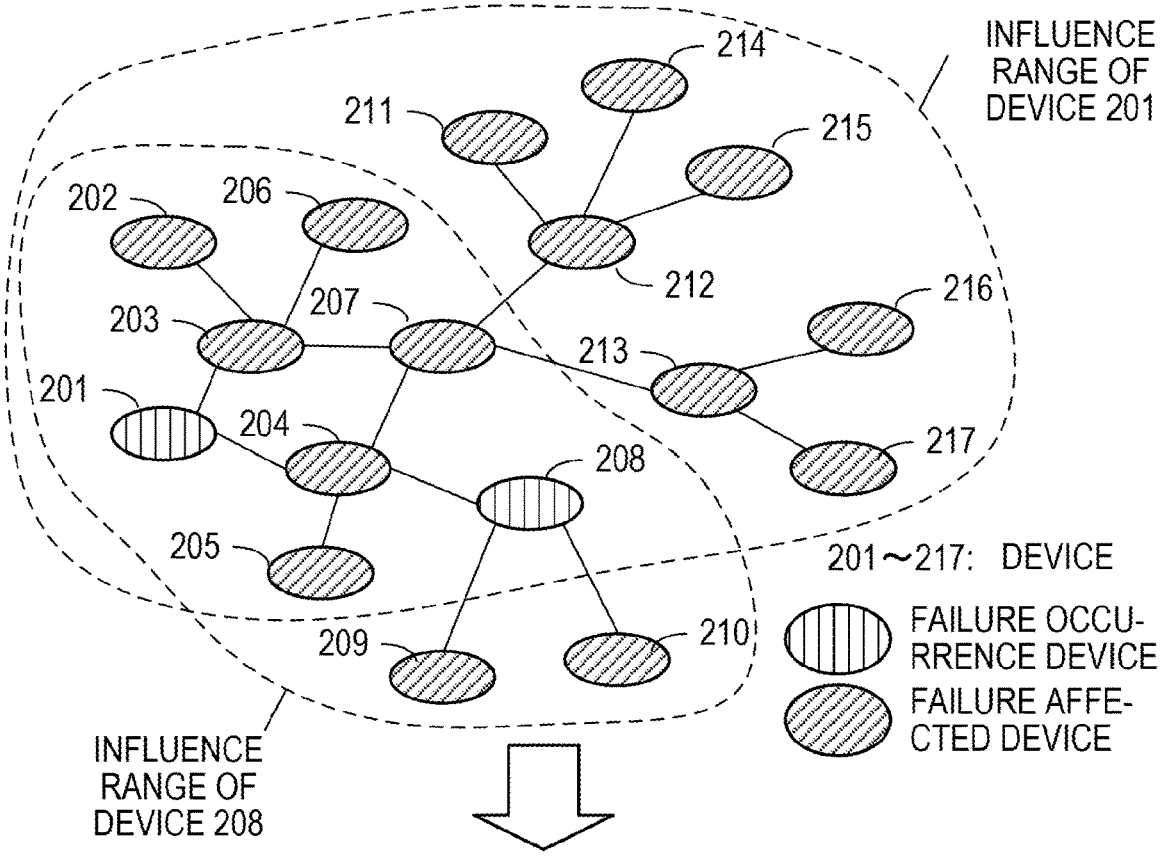
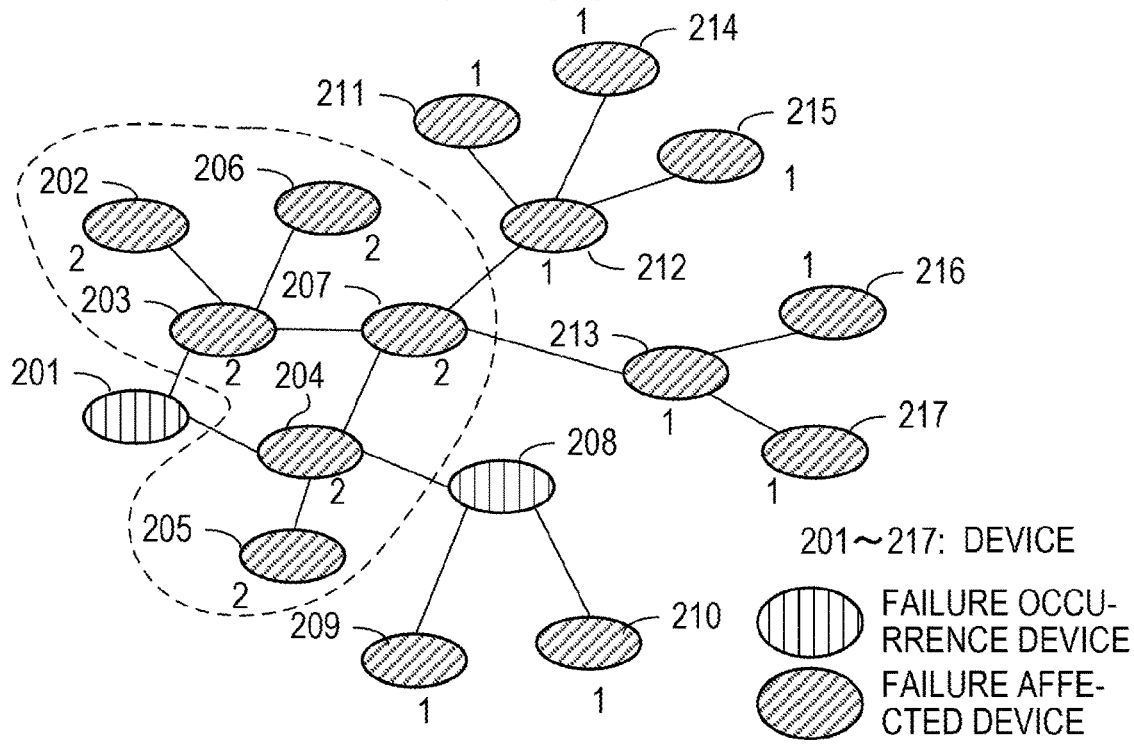

SEARCH INFLUENCE RANGE OF ABNORMALITY OCCURRENCE DEVICE
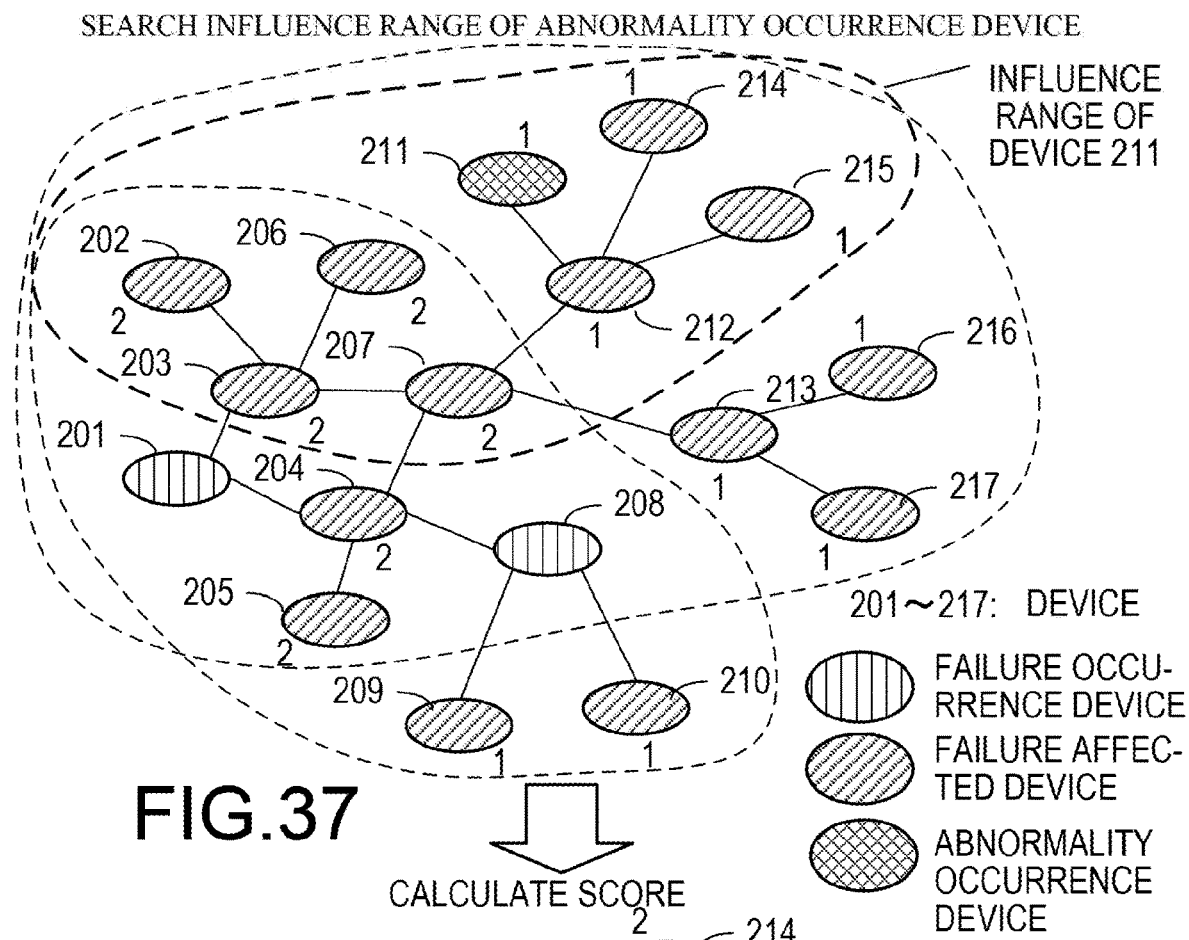
FIG.37
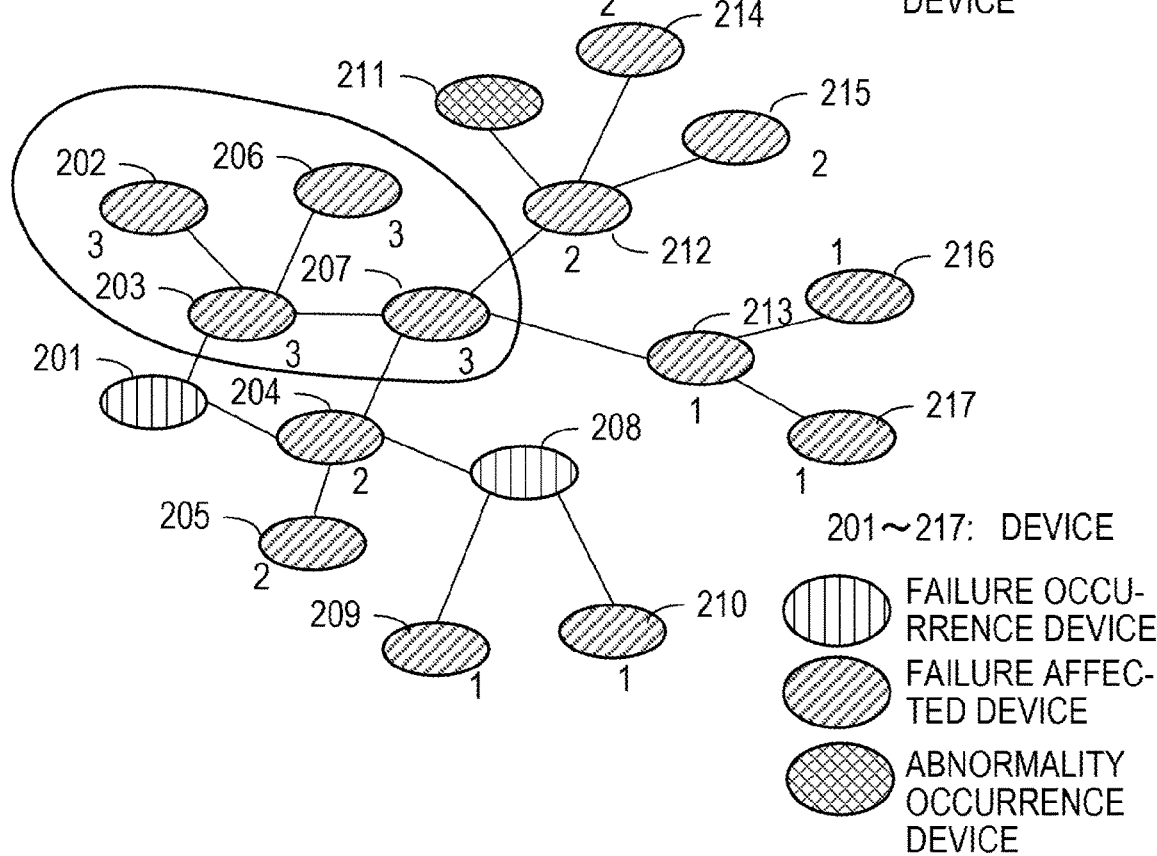

INFLUENCE RANGE IDENTIFICATION METHOD AND INFLUENCE RANGE IDENTIFICATION APPARATUS

CROSS-REFERENCE TO RELATED APPLICATION

This application is based upon and claims the benefit of priority of the prior Japanese Patent Application No. 2017-106651, filed on May 30, 2017, the entire contents of which are incorporated herein by reference.

FIELD

The embodiments discussed herein are related to an influence range identification method and an influence range identification apparatus.

BACKGROUND

In a computer network system, when a failure occurs in some devices in the system, devices that are dependent from the devices are also affected by the failure. For example, the device affected by the failure may be slower in operation than a normal device or may not execute an application program. The influence of such a failure occurs in a chain manner via a network. Especially, in large scale systems, many devices are dependent from each other. For this reason, the influence of the failure is not limited to the device under the failure or the device directly connected to the device, but extends to the various surrounding devices.

In the case where the failure occurs in one device and another device is affected by the failure, a user may notice that another device is affected by the failure of the one device. However, depending on the device, despite being affected by the failure, the user may not notice that another device is affected by the failure of the one device. When the user does not notice that the device is affected by the failure, the user does not notify an operator of the system that there is a device affected by the failure and no action is taken by the operator. Further, at the time of the occurrence of the failure, no load is applied (e.g., an application program may not be executed), and thus, there may be a device that is not affected at present, but is more likely to be affected when a load is applied.

The device for which the user is not aware that the device is affected by the failure or the device that is not affected by the failure because load is not applied may cause trouble in the future. Therefore, it is important for the operator of the system to recognize a device group (influence range) that may be affected by the device for a stable operation of the system.

Therefore, various techniques have been developed to support management of the system at the time of an occurrence of a failure. For example, a system management method capable of obtaining information may be considered in which, for example, the contents of a task that operates on a computer in which the failure occurs or a priority thereof may be obtained. Further, a failure influence analyzing apparatus which correctly identifies a range affected by the failure may also be considered. In addition, a failure propagation management system may also be considered that may properly grasp to what kind of information processing of what kind of device the influence of the failure is propagated when the failure occurs in a predetermined information device. Further, an operation management apparatus may be considered, which may separately display the influence ranges for individual failures or cause parts for the failures of individual services.

Related technologies are disclosed in, for example, Japanese Laid-Open Patent Publication No. 2005-234861, Japanese Laid-Open Patent Publication No. 2011-113122, Japanese Laid-Open Patent Publication No. 2013-206047, and Japanese Laid-Open Patent Publication No. 2015-022396.

SUMMARY

According to an aspect of the present invention, provided is an influence range identification apparatus including a memory and a processor coupled to the memory. The processor is configured to acquire failure occurrence information indicating a first device in which a failure occurs among a plurality of devices included in a network. The processor is configured to perform a first search of searching for second devices of the plurality of devices starting from the first device based on a connection relationship among the plurality of devices indicated by a system configuration model. The second devices exist in a first influence range which is likely to be affected by the failure. The processor is configured to perform first determination of determining whether a third device exists among the second devices. The third device has abnormality due to the failure. The processor is configured to perform second determination of determining whether each of the second devices other than the third device exits in a second influence range starting from the third device based on the connection relationship among the second devices. The second influence range is likely to be affected by the abnormality of the third device. The processor is configured to perform third determination of determining a rank of a degree of a possibility of being affected by the failure with respect to each of the second devices other than the third device based on a result of the second determination. The processor is configured to output rank information indicating the rank determined in the third determination.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 14 is a diagram illustrating an example of influence range search route information;

FIG. 32 is a diagram illustrating an example of an influence device ranking result;

FIG. 36 is a diagram illustrating a score calculation example of superimposing the influence ranges of a plurality of failure occurrence devices; and FIG. 37 is a diagram illustrating the score calculation example of superimposing the influence range of the abnormality occurrence device with the influence ranges of the plurality of failure occurrence devices.

DESCRIPTION OF EMBODIMENTS

A system operator recognizes an occurrence of a failure by receiving a failure occurrence notification from a user. In addition, the operator who recognizes the occurrence of the failure investigates and restores the device by estimating an influence range by, for example, a failure influence analysis.

However, in the failure influence analysis in the related art, a difference in a degree of a possibility of being affected by the failure is not determined for the device within the influence range of the failure. For this reason, a large number of devices presumed to be affected are presented at the same level regardless of the degree of the possibility of being affected by the failure. As a result, the operator may first investigate and restore a device having a lower possibility of being affected, i.e., a device that is unlikely to be affected. When the operator first investigates the device that is unlikely to be affected by the failure, a response to the device that is actually affected by the failure is delayed, and it will take time to recover from the failure accordingly.

Hereinafter, embodiments will be described with reference to the accompanying drawings. Each embodiment may be implemented by combining a plurality of embodiments within a scope without a contradiction.

First Embodiment

First, a first embodiment will be described. In the first embodiment, by causing an influence range identification apparatus to execute an influence range identification method, ranking according to a degree of a possibility of being affected by a failure is performed for each device within the influence range of the failure. In addition, the influence range identification apparatus may implement the influence range identification method, for example, by executing the processing described in an influence range identification program.

Figure 1:
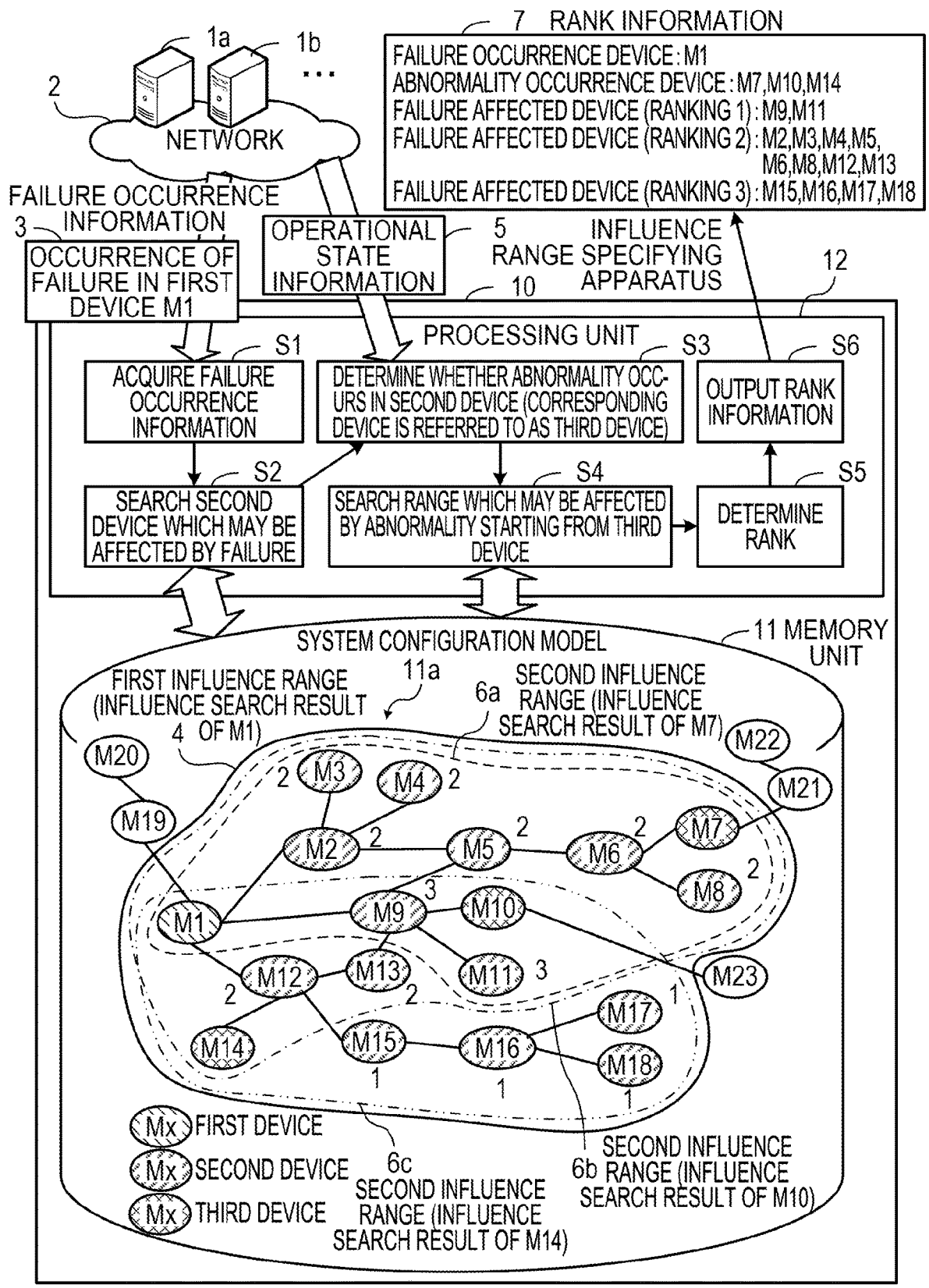
FIG. 1 is a diagram illustrating an example of an influence range identification apparatus according to a first embodiment.

FIG. 1 is a diagram illustrating an example of an influence range identification apparatus according to a first embodiment. The influence range identification apparatus 10 is connected to a plurality of devices 1a, 1b, . . . through a network 2. The plurality of devices 1a, 1b, . . . is, for example, a server computer or a storage device. Further, a virtual machine is also included in the plurality of devices 1a, 1b, . . . .

When the failure occurs in any one device connected to the network 2, the influence range identification apparatus 10 identifies the influence range of the failure. In this case, the influence range identification apparatus 10 ranks the order of the devices existing within the influence range based on the possibility of being affected. In order to perform such processing, the influence range identification apparatus 10 includes a memory unit 11 and a processing unit 12.

The memory unit 11 stores a system configuration model 11a indicating a connection relationship between the plurality of devices 1a, 1b, . . . . The memory unit 11 is, for example, a memory or a storage device included in the influence range identification apparatus 10.

When the failure occurs, the processing unit 12 identifies the influence range of the failure and ranks the order of the device that may be affected by the failure. The processing unit 12 is, for example, a processor or an arithmetic circuit included in the influence range identification apparatus 10.

The processing unit 12 acquires failure occurrence information 3 indicating a first device with the failure among the plurality of devices 1a, 1b, . . . (step S1). For example, the processing unit 12 acquires an error message as the failure occurrence information 3 from the device with the failure. Further, the processing unit 12 may acquire the failure occurrence information 3 input by an operator of a system.

In the example of FIG. 1, the failure occurs in a device having a device name "M 1" and the device becomes the first device.

When the processing unit 12 acquires the failure occurrence information 3, the processing unit 12 understands a connection relationship between the plurality of devices 1a, 1b, . . . by referring to the system configuration model 11a. In addition, based on the connection relationship between the plurality of devices 1a, 1b, . . . , the processing unit 12 searches a plurality of second devices which exists in a first influence range 4 which may be affected by the failure starting from the first device (step S2). For example, first search information in which a search order of the connection relationship starting from the device is associated with a combination of a function and a type of the failure of the first device is preset in the processing unit 12. The processing unit 12 sets a device which may be reached as a plurality of second devices by tracing the connection relationship between the plurality of devices with the first device as the starting point in accordance with the first search information. In the example of FIG. 1, devices with device names "M2" to "M18" are detected as the second device.

Next, the processing unit 12 determines whether an abnormality occurs in each of the plurality of second devices due to the influence of the failure (step S3). In addition, the processing unit 12 regards the device having the abnormality due to the influence of the failure as a third device.

For example, the processing unit 12 regards each of the plurality of second devices as a determination target and acquires operational state information 5 indicating an operational state of the second device to be determined during a period including a failure occurrence time from the second device to be determined. In addition, the processing unit 12 compares the operational state indicated in the operational state information 5 with the operational state of the second device to be determined during a past predetermined period to determine whether the abnormality occurs in the second device to be determined. The operational state during the past predetermined period means, for example, an average operational state of the second device to be determined within a period including the same time as the failure occurrence time on a plurality of past days of the same day of the week as a day on which the failure occurs. The operational state of the second device to be determined may be expressed by, for example, a usage rate of a processor, the usage rate of the memory, and the number of accesses per unit time to the storage device.

In order to compare the operational states, for example, the processing unit 12 digitizes the difference between the operational state during the period including the failure occurrence time and the operational state during the past predetermined period. The digitized difference is, for example, the difference in representative value (such as an average value) of a numerical value indicating the operational state. For example, the processing unit 12 acquires the difference between the representative value of the numerical value (such as a utilization rate of the processor) indicating the operational state within the period including the failure occurrence time and the representative value of the numerical value indicating the operational state within the past predetermined period. When a value indicating the difference is equal to or larger than a threshold, the processing unit 12 determines that the abnormality occurs in the second device to be determined. In the example of FIG. 1, it is determined that the abnormality occurs in each of the devices with device names "M7", "M10", and "M14" and the devices are identified as the third device.

Based on the connection relationship between the plurality of second devices, the processing unit 12 searches the second device which exists within a range (second influence range) which may be affected by the abnormality of the third device starting from each third device which is determined to be abnormal (step S4). In the example of FIG. 1, a second influence range 6a of the third device having the device name "M7", a second influence range 6b of the third device having the device name "M10", and a second influence range 6c of the third device having the device name "M14" are searched.

By the search, it may be determined whether each of the plurality of second devices other than the third device exists in the second influence ranges 6a, 6b, and 6c that may be affected by the abnormality of the third device. For example, the processing unit 12 traces the connection relationship between the plurality of second devices starting from the third device according to second search information indicating a search order of the connection relationship from the device as the starting point, which is associated with the combination of the function of the third device and the type of the abnormality in advance. In addition, the processing unit 12 determines that the device reachable by tracing the connection relationship between the plurality of second devices exists in the second influence ranges 6a, 6b, and 6c. In the example of FIG. 1, the second influence range 6a of the device having the device name "M 7" includes the respective devices having the device names "M2" to "M11". The second influence range 6b of the device having the device name "M10" includes the respective devices having the device names "M2" to "M14". The second influence range 6c of the device having the device name "M14" includes the respective devices having the device names "M9" to "M18".

Based on a determination result indicating whether the second devices are present within the second influence ranges 6a, 6b, and 6c, the processing unit 12 determines a ranking of the degree of the possibility of being affected by the failure with respect to each of the plurality of second devices other than the third device (step S5). For example, the range in which the number of overlapping times of the influence ranges of the first device with the failure and the third device determined to be abnormal is large is the influence range of the device in which more abnormalities or failures are detected. From this point, it may be determined that there is a high possibility that a device existing in a range where the influence ranges overlap a lot is affected by the failure or abnormality. Therefore, the processing unit 12 determines a second device in which the number of times to be determined to exist in the second influence ranges 6a, 6b, and 6c starting from any one of the plurality of third devices is larger as a higher rank, for example.

In the system configuration model 11a illustrated in FIG. 1, for each of the second devices, the number of times at which each second device is included in the second influence ranges 6a, 6b, and 6c obtained by the search in step S4 is displayed around a node corresponding to the second device. Since the devices having the device names "M9" and "M11" exist in all of the second influence ranges 6a, 6b, and 6c, the number of times is determined as three times. Since the devices having the device names "M2" to "M8" exist in the second influence ranges 6a and 6b and the devices of "M12" and "M13" exist in the second influence ranges 6b and 6c, each of the number of times is determined as two times. Since the devices having the device names "M15" and "M18" exist in the second influence range 6c, the number of times is determined as one time.

Herein, a case of ranking in three stages is considered. For example, the rank of the second device having a high possibility of being affected is set as "ranking 1", the rank of the second device having a medium degree of possibility of being affected is set as "ranking 2", and the rank of the second device having a low possibility of being affected is set as "ranking 3". In this case, the ranks of the devices having the device names "M9" and "M11" are "ranking 1". The ranks of the devices having the device names "M2" to "M8", "M12", and "M13" are "ranking 2". The ranks of the devices having the device names "M15" to "M18" are "ranking 3".

Lastly, the processing unit 12 outputs rank information 7 indicating the rank determined for each of the plurality of second devices other than the third device (step S6). According to such an influence range identification apparatus 10, for example, the operator of the system may recognize the difference in the degree of the possibility of being affected based on the rank information 7 when there is a plurality of devices which may be affected by the failure. As a result, the operator may first perform a recovery operation of the failure for the device which is highly likely to be affected by the failure to efficiently perform the recovery operation of the failure.

In the example of FIG. 1, the failure is detected only in one first device, but there may be a plurality of first devices in which the failure occurs. In this case, the processing unit 12 executes processing of steps S1 and S2 for each of the plurality of first devices. Next, the processing unit 12 performs ranking of a first stage on each of the second devices so that the second device located in a portion where the influence ranges of the failures of the plurality of respective first devices overlap with each other has a higher rank. Next, the processing unit 12 performs the processing of steps S3 and S4. In addition, in the rank determination in step S5, the processing unit 12 performs ranking of a second stage so that the second device which exists in the range where the overlapping of the influence ranges of each of the plurality of first devices and each of the plurality of third devices is large has a higher rank. By determining the rank based on an overlapping degree of the influence ranges of the plurality of first devices and the plurality of third devices when there is the plurality of first devices as described above, the ranks may be divided into multiple stages as more first devices or third devices are provided and precision of rank dividing may be enhanced.

The processing unit 12 searches the devices within the influence range by using the first search information according to the function and the type of the failure of the first device and searches the devices within the influence range by using the second search information according to the function and the type of the abnormality of the third device. As a result, since the influence ranges of the failure and the abnormality may be accurately obtained, the range in which the influence ranges overlap with each other may also be accurately obtained. Therefore, the precision of the rank dividing is enhanced.

Second Embodiment

Next, a second embodiment will be described.

Figure 2:
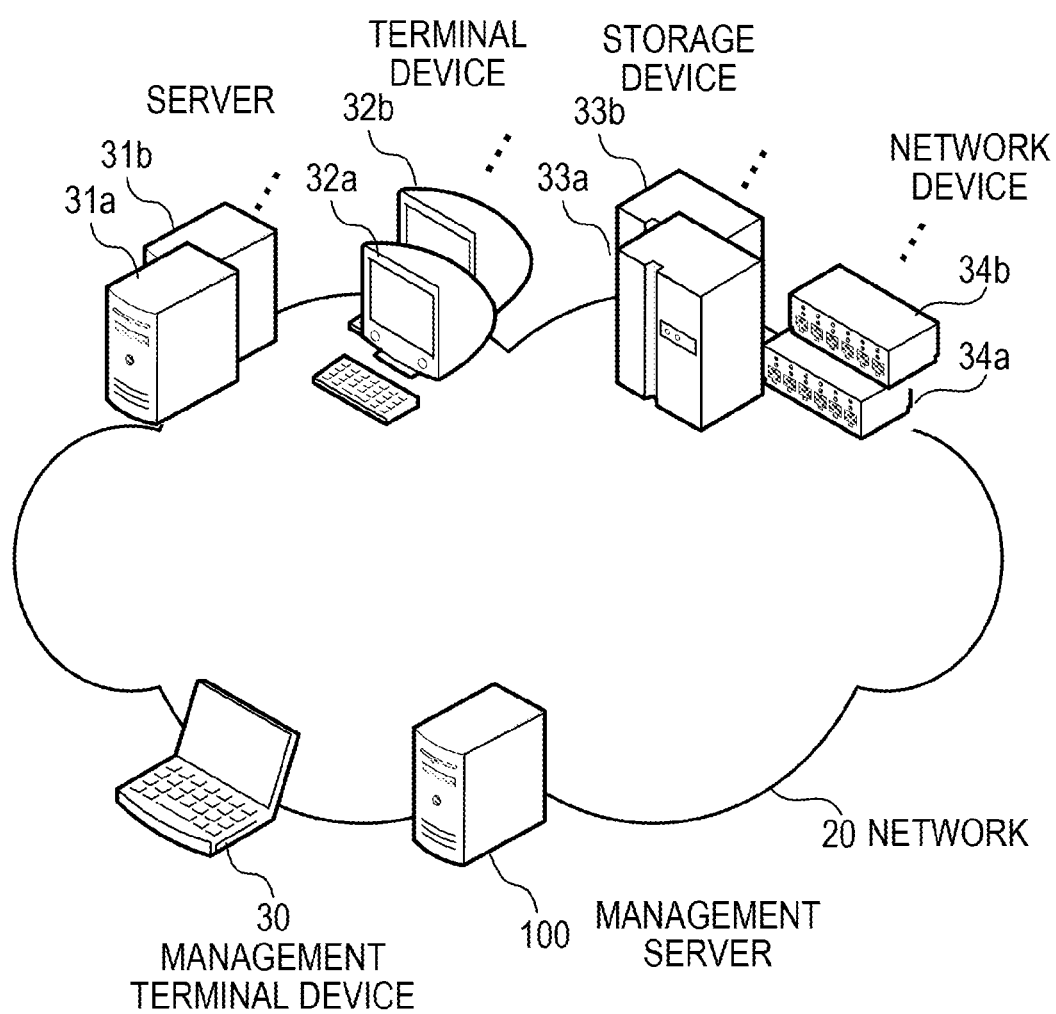
FIG. 2 is a diagram illustrating a system configuration example according to a second embodiment.

FIG. 2 is a diagram illustrating a system configuration example according to a second embodiment. In a network 20, for example, servers 31a, 31b, . . . , terminal devices 32a, 32b, . . . , storage devices 33a, 33b, . . . , network devices 34a, 34b, . . . and so on are provided as devices to be monitored. A management server 100 and a management terminal device 30 are further connected to the network 20. The management server 100 acquires information from the device to be monitored and detects the influence range of the failure when any one device has the failure. The management terminal device 30 is a computer used by the operator of the system.

Figure 3:
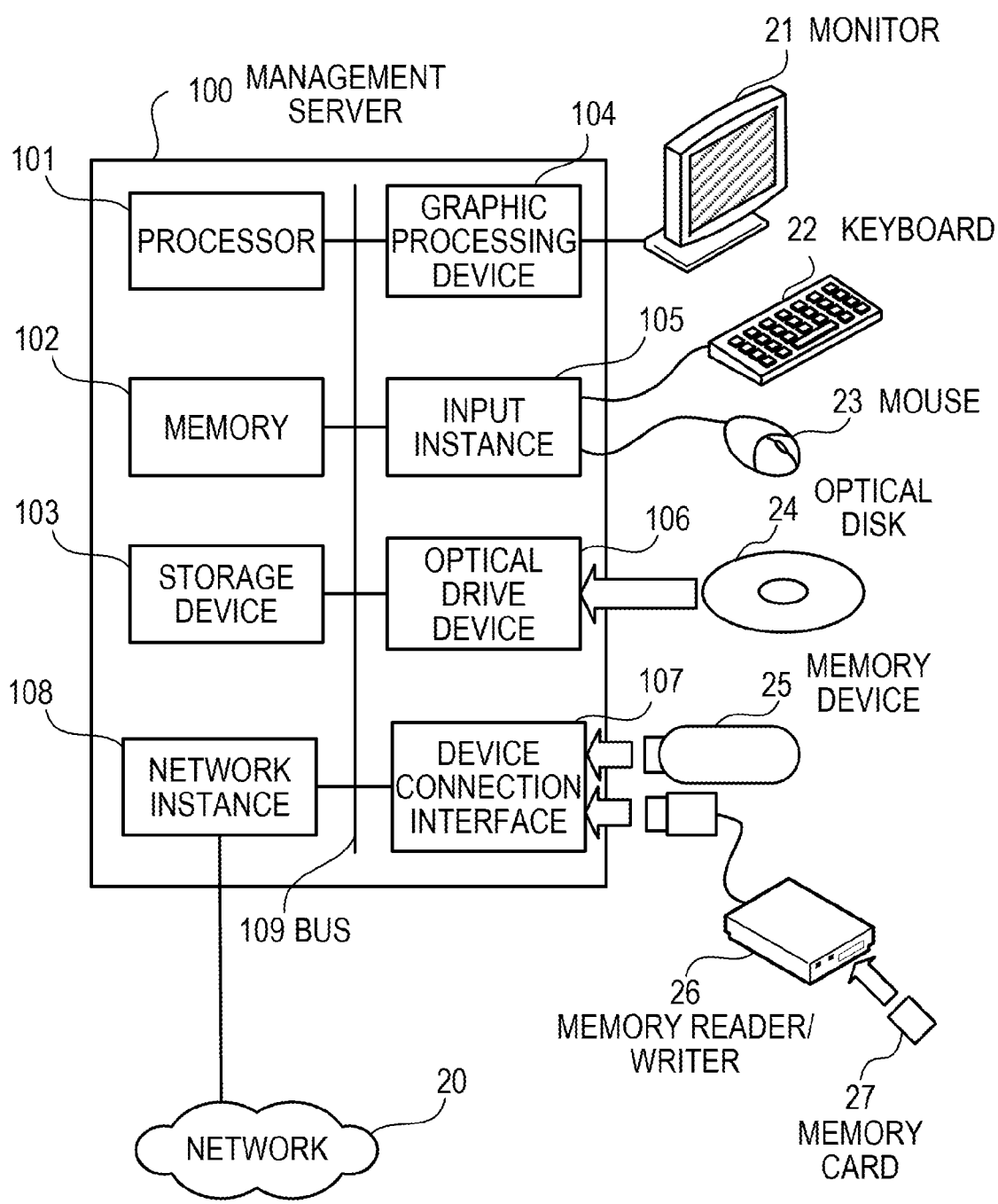
FIG. 3 is a diagram illustrating an example of hardware of a management server used in the second embodiment.

FIG. 3 is a diagram illustrating an example of hardware of a management server used in the second embodiment. The entirety of the management server 100 is controlled by a processor 101. A memory 102 and a plurality of peripheral devices are connected to the processor 101 via a bus 109. The processor 101 may be a multiprocessor. The processor 101 is, for example, a central processing unit (CPU), a micro processing unit (MPU), or a digital signal processor (DSP). The processor 101 may implement at least some of functions implemented by executing a program by electronic circuits including an application specific integrated circuit (ASIC), a programmable logic device (PLD).

The memory 102 is used as a main memory device of the management server 100. At least some of the programs of an operating system (OS) executed by the processor 101 or application programs are temporarily stored in the memory 102. Further, the memory 102 stores various data required for the processing by the processor 101. As the memory 102, for example, a volatile semiconductor memory device such as a random access memory (RAM) is used.

The peripheral devices connected to the bus 109 include a storage device 103, a graphic processing device 104, an input interface 105, an optical drive device 106, a device connection interface 107, and a network interface 108.

The storage device 103 writes and reads data electrically or magnetically to and from a built-in recording medium. The storage device 103 is used as an auxiliary memory device of the computer. The programs of the OS, the application programs, and various data are stored in the storage device 103. Further, as the storage device 103, for example, a hard disk drive (HDD) or a solid state drive (SSD) may be used.

A monitor 21 is connected to the graphic processing device 104. The graphic processing device 104 displays an image on a screen of the monitor 21 according to a command from the processor 101. As the monitor 21, for example, a display device using a cathode ray tube (CRT), or a liquid crystal display may be used.

A keyboard 22 and a mouse 23 are connected to the input interface 105. The input interface 105 transmits a signal sent from the keyboard 22 or the mouse 23 to the processor 101. Further, the mouse 23 is an example of a pointing device and other pointing devices may also be used. Other pointing devices include a touch panel, a tablet, a touch pad, and a track ball.

The optical drive device 106 reads data recorded on the optical disk 24 using, for example, a laser beam. The optical disk 24 is a portable recording medium on which data is recorded so as to be readable by reflection of light. The optical disk 24 includes, for example, a digital versatile disc (DVD), a DVD-RAM, a compact disc read only memory (CD-ROM), and a CD-recordable (R)/rewritable (RW).

The device connection interface 107 is a communication interface for connecting the peripheral devices to the management server 100. For example, a memory device 25 and a memory reader/writer 26 may be connected to the device connection interface 107. The memory device 25 is a recording medium having a communication function with the device connection interface 107. The memory reader/writer 26 is a device that writes data to a memory card 27 or reads the data from the memory card 27. The memory card 27 is a card type recording medium.

The network interface 108 is connected to the network 20. The network interface 108 transmits/receives data to/from another computer or a communication device via the network 20.

By the hardware configuration described above, a processing function of the management server 100 in the second embodiment may be implemented. Further, the influence range identification apparatus 10 described in the first embodiment may also be implemented by the same hardware as the management server 100 illustrated in FIG. 3.

The management server 100 implements the processing function of the second embodiment by executing the program recorded in, for example, a computer readable recording medium. The program that describes processing contents executed by the management server 100 may be recorded in various recording media. For example, the program executed by the management server 100 may be stored in the storage device 103. The processor 101 loads at least a part of the program in the storage device 103 to the memory 102 and executes the program. Further, the program executed by the management server 100 may be recorded, for example, in a portable recording medium such as the optical disk 24, the memory device 25, or the memory card 27. The program stored in the portable recording medium may be executed after being installed in the storage device 103, for example, under the control of the processor 101. Further, the processor 101 may read and execute the program directly from the portable recording medium.

Next, a function for visualizing the device affected by the failure in the management server 100 will be described.

Figure 4:
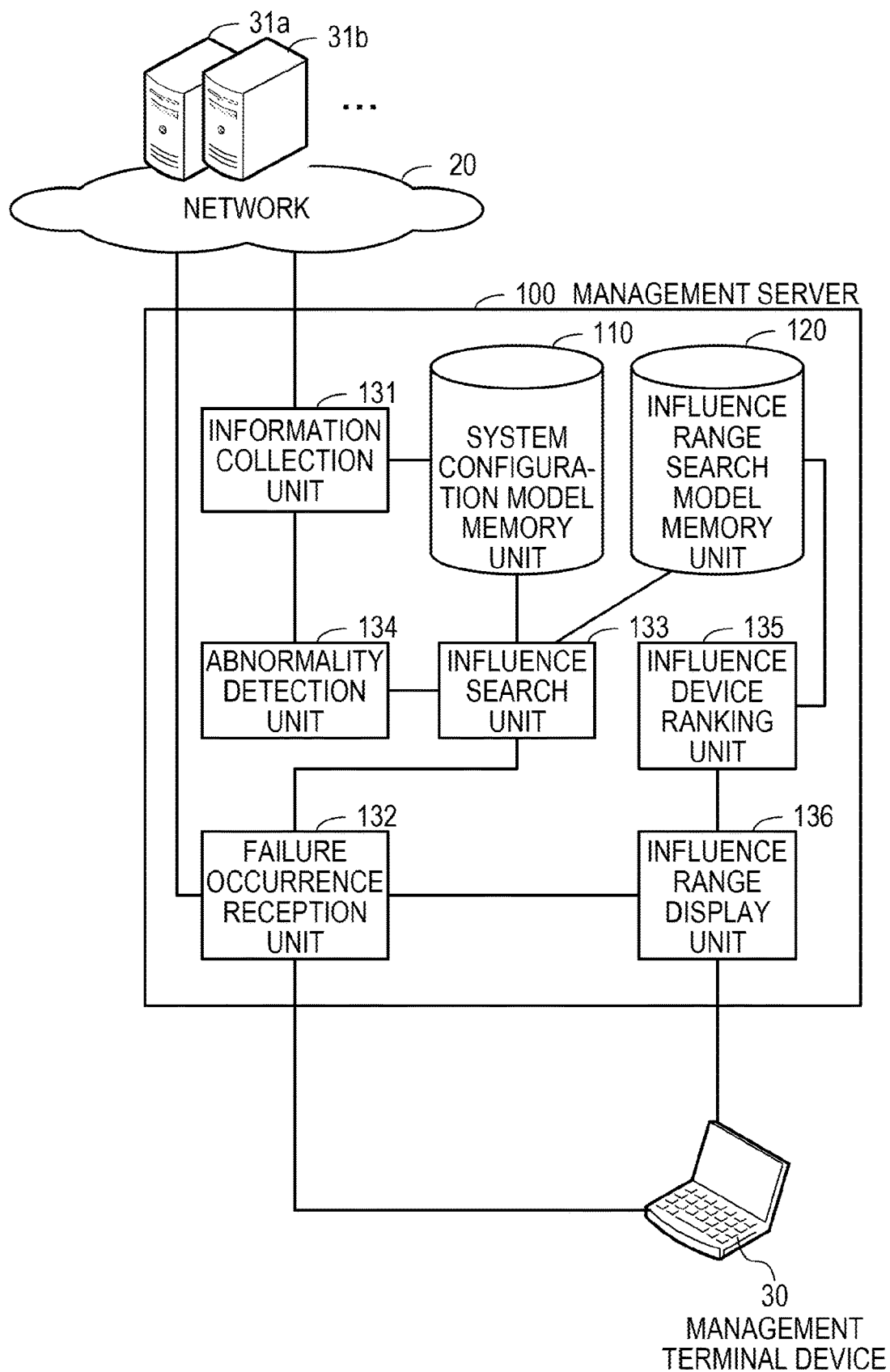
FIG. 4 is a block diagram illustrating the management server.

FIG. 4 is a block diagram illustrating the management server. The management server 100 includes a system configuration model memory unit 110, an influence range search model memory unit 120, an information collection unit 131, a failure occurrence reception unit 132, an influence search unit 133, an abnormality detection unit 134, an affected device ranking unit 135, and an influence range display unit 136.

The system configuration model memory unit 110 stores a system configuration model indicating the configuration of a device to be managed, which is included in the system. The device to be managed also includes a virtual device such as a virtual machine (VM) in addition to a hardware device such as a server. As the system configuration model memory unit 110, for example, a part of a memory area of the memory 102 or the storage device 103 is used.

The influence range search model memory unit 120 stores an influence range search model indicating the configuration of a device to be searched in the influence range. As the influence range search model memory unit 120, for example, a part of the memory area of the memory 102 or the storage device 103 is used.

The information collection unit 131 collects device connection information and creates the system configuration model. Further, the information collection unit 131 acquires operational state information indicating the operational state of the device from each device. The operational state information includes, for example, resource information indicating a use situation of a resource. Further, as the operational state information, log information indicating a history of an output message may be collected.

The failure occurrence reception unit 132 detects the occurrence of the failure in the device to be managed. For example, the failure occurrence reception unit 132 may automatically detect the occurrence of the failure by monitoring the device such as the VM. Further, the failure occurrence reception unit 132 may detect the occurrence of the failure by an input from the operator. Hereinafter, the device of which the failure occurrence is recognized by the failure occurrence reception unit 132 is called a failure occurrence device.

The influence search unit 133 estimates the influence range of the failure occurrence device. For example, the influence search unit 133 searches the influence range based on system configuration information and a predefined influence range search route starting from the failure occurrence device. In addition, the influence search unit 133 extracts a device that may be affected by the failure from the system configuration model based on a search result of the influence range. Hereinafter, the device that may be affected by a failure will be called a failure affected device. Further, the influence search unit 133 also searches the influence range starting from a device that is confirmed to be affected by the failure.

The abnormality detection unit 134 detects the device affected by the failure. For example, the abnormality detection unit 134 confirms whether each of the failure affected devices extracted by the influence search unit 133 is actually affected based on resource information and log information. Hereinafter, a device confirmed to be actually affected will be called an abnormality occurrence device.

The affected device ranking unit 135 ranks the possibility of being affected (influence degree). For example, the affected device ranking unit 135 increases the influence degree in the case of the failure affected device of which the number of times at which the device is determined to be in the influence range is larger by the search of the influence range by the influence search unit 133. In addition, the affected device ranking unit 135 performs a rank dividing according to the influence degree for each failure affected device.

The influence range display unit 136 is a user interface that performs display control of the influence range of the failure. For example, the influence range display unit 136 displays the failure influence device ranked by the affected device ranking unit 135 on the monitor 21 or the management terminal device 30. Further, the influence range display unit 136 also serves as an interface when an operator inputs the failure occurrence using the keyboard 22 or the management terminal device 30.

A line connecting respective components illustrated in FIG. 4 illustrates a part of a communication route and may also be set as a communication route other than the illustrated communication route. In addition, the function of each component illustrated in FIG. 4 may be implemented, for example, by executing a program module corresponding to the component in the computer.

Next, the information stored in the management server 100 will be specifically described.

Figure 5:
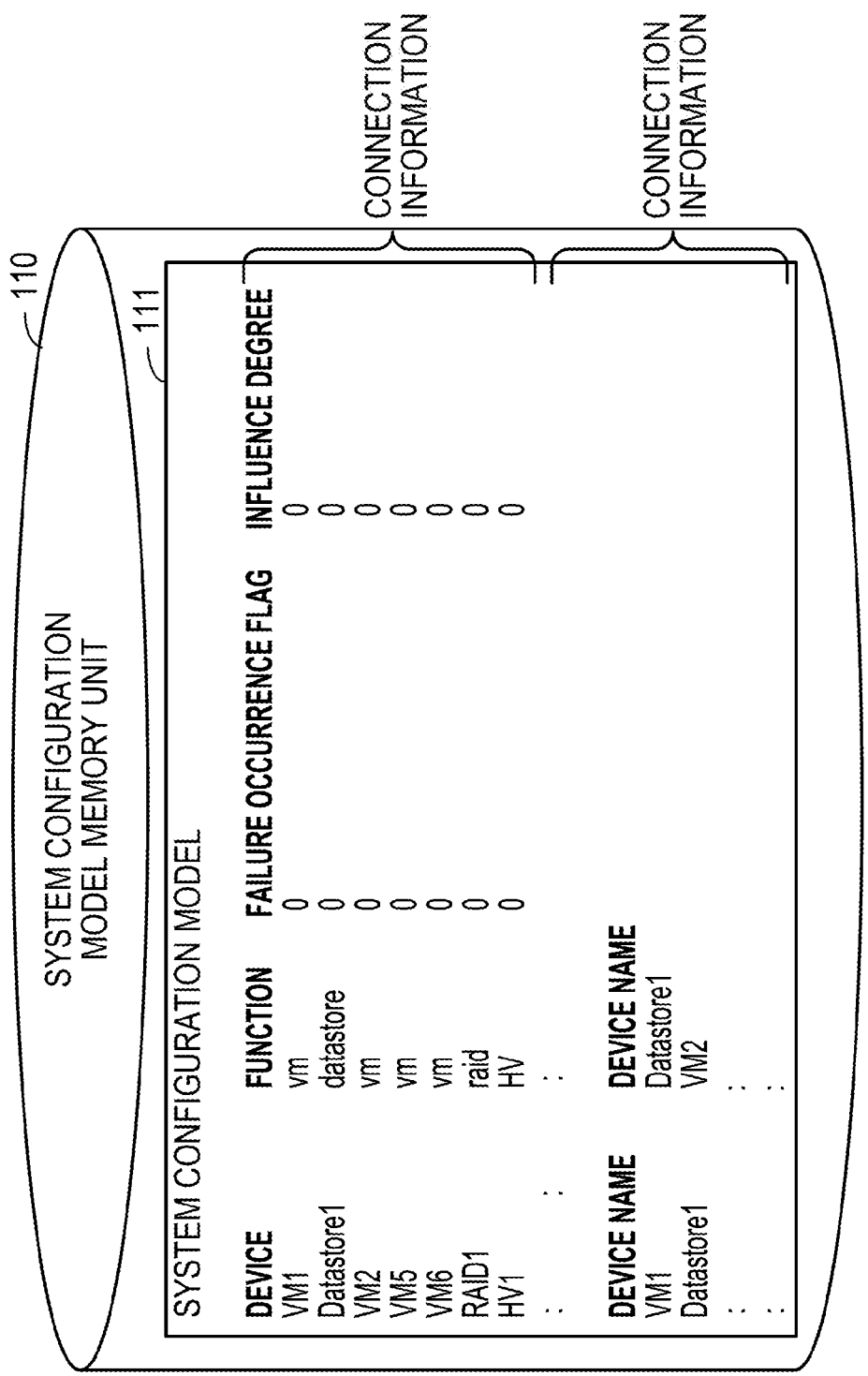
FIG. 5 is a diagram illustrating an example of a system configuration model stored in a system configuration model memory unit.

FIG. 5 is a diagram illustrating an example of a system configuration model stored in a system configuration model memory unit. The system configuration module 111 includes device information and connection information. In the device information, a flag (failure occurrence flag) indicating the function and the presence/absence of the failure or abnormality of the device and the influence degree are set, which are associated with a name (device name) of the device (including the virtual device such as the VM) which is the component of the system. A list of devices directly connected is set on the network in the connection information. Further, the device name of each device is set as a name given with identification number after the name indicating the function.

Figure 6:
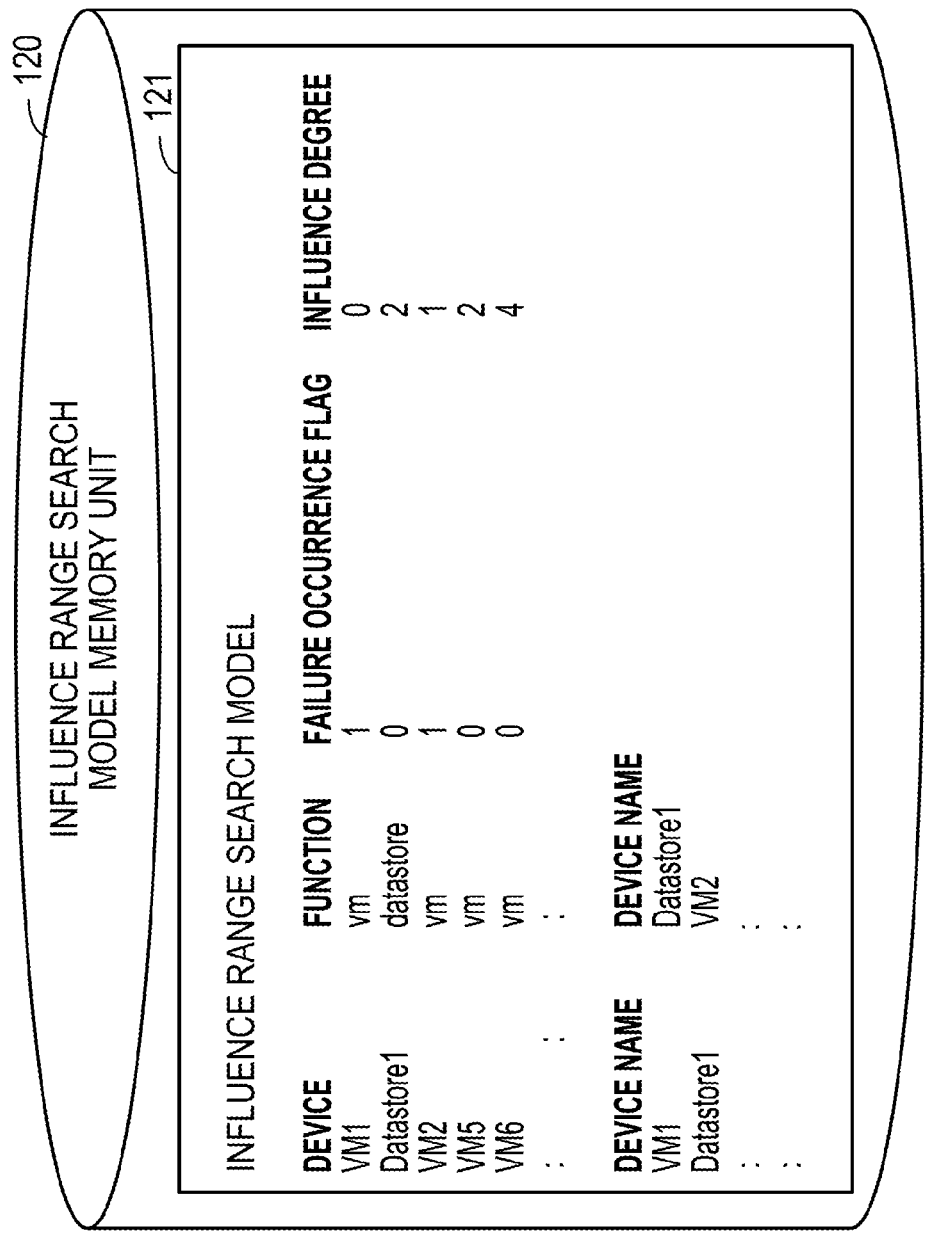
FIG. 6 is a diagram illustrating an example of an influence range search model stored by an influence range search model memory unit.

FIG. 6 is a diagram illustrating an example of an influence range search model stored by an influence range search model memory unit. The influence range search model 121 includes information on the failure occurrence device and the failure affected device among the information indicated in the system configuration model 111.

Next, ranking processing of the failure affected device in the management server 100 will be specifically described. The management server 100 creates the system configuration model 111 as advance processing for ranking the failure affected device.

Figure 7:
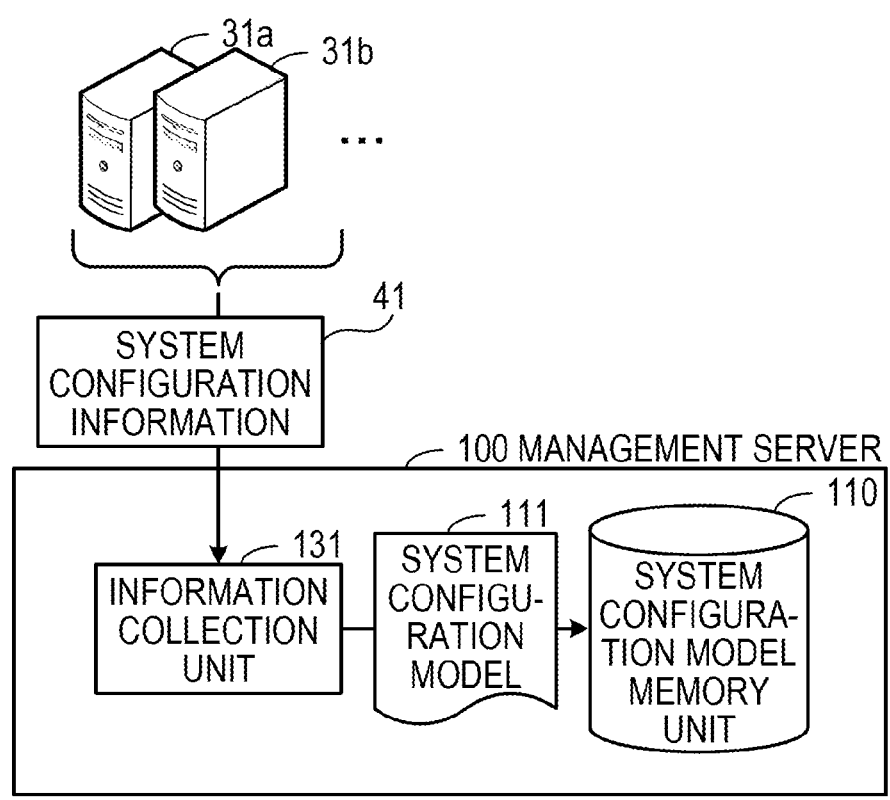
FIG. 7 is a diagram illustrating an example of system configuration model creation processing.

FIG. 7 is a diagram illustrating an example of system configuration model creation processing. For example, the information collection unit 131 periodically collects system configuration information 41 from the devices such as the servers 31a, 31b, . . . to be managed. The system configuration information 41 includes a device name of a device of a collection source or a device name of another device connected to the device of the collection source. The information collection unit 131 creates the system configuration model 111 based on the collected system configuration information 41. The information collection unit 131 stores the created system configuration model 111 in the system configuration model memory unit 110.

Figure 8:
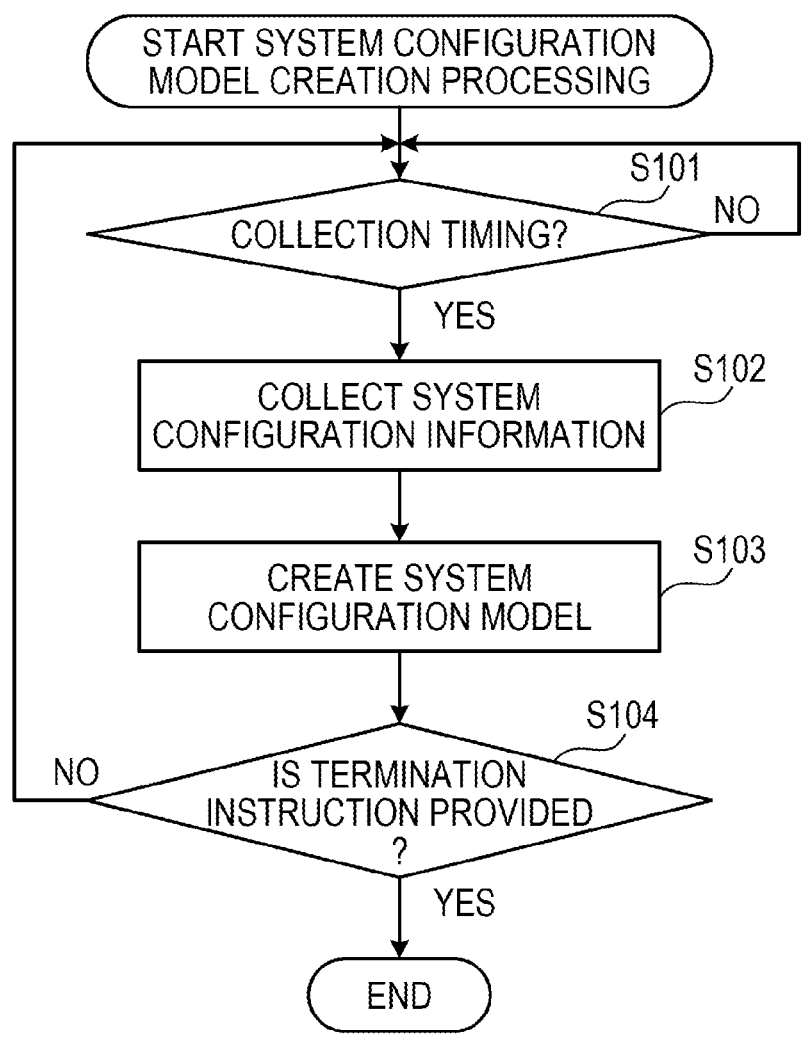
FIG. 8 is a flowchart illustrating an example of a system configuration model creation processing order.

FIG. 8 is a flowchart illustrating an example of a system configuration model creation processing order. Hereinafter, the processing illustrated in FIG. 8 will be described according to a step number.

(Step S101) The information collection unit 131 determines whether a collection timing of the system configuration information 41 is reached. For example, when the information collection unit 131 collects the system configuration information 41 at a predetermined interval such as once a day, the information collection unit 131 determines that the collection timing is reached when a predetermined collection time is reached. Further, the information collection unit 131 may collect the system configuration information 41 when the failure occurs. In this case, for example, when the occurrence of the failure is detected in the failure occurrence reception unit 132, the information collection unit 131 determines that the collection timing of the system configuration information 41 is reached. When the collection timing is reached, the information collection unit 131 makes the processing proceed to step S102. Further, when the collection timing is not reached, the information collection unit 131 repeats the processing of step S101.

(Step S102) The information collection unit 131 collects the system configuration information 41 from each of the devices including the servers 31a, 31b, . . . , in the system.

(Step S103) The information collection unit 131 creates the system configuration model 111 based on the collected system configuration information 41. In addition, the information collection unit 131 stores the created system configuration model 111 in the system configuration model memory unit 110.

(Step S104) The information collection unit 131 determines whether to instruct to terminate system configuration model creation processing. When the instruction of the termination is input, the information collection unit 131 terminates the system configuration model creation processing. When the instruction of the termination is not input, the information collection unit 131 makes the processing proceed to step S101 to stand by until the next collection timing is reached.

In this way, the system configuration model 111 is periodically created and kept up to date. In the system configuration model 111, a connection relationship between the devices is indicated. As a result, the connection relationship between the devices may be represented by a graph based on the system configuration model 111.

Figure 9:
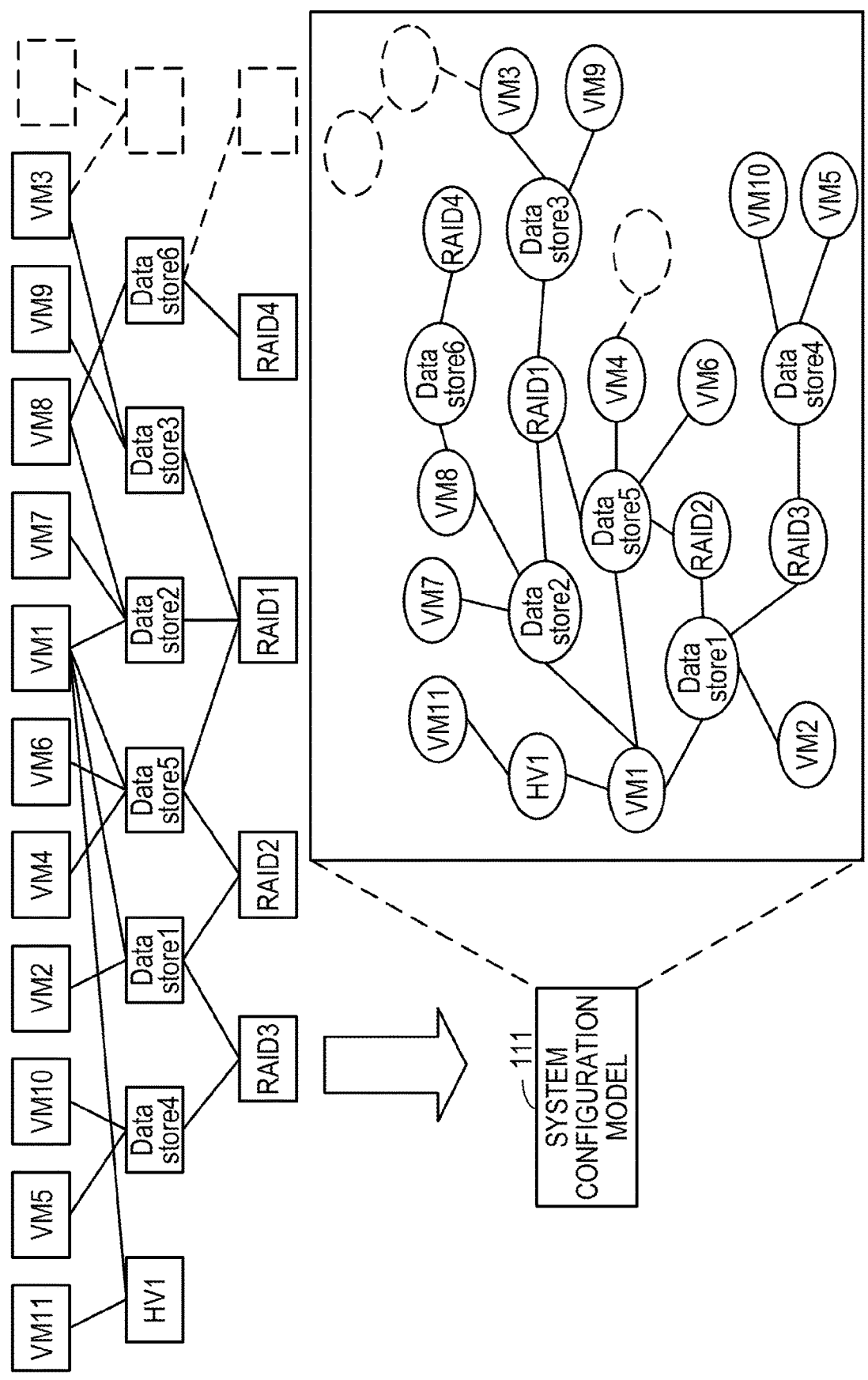
FIG. 9 is a diagram illustrating an example of representing the system configuration model by a graph.

FIG. 9 is a diagram illustrating an example of representing the system configuration model by a graph. An upper end of FIG. 9 illustrates the connection relationship of the devices in the network 20. Such a connection relationship is set in the system configuration model 111. The system configuration model 111 may be represented by the graph in which each device is the node and the connected devices are connected by edges.

When the failure occurs in any one device, the influence range of the failure is examined by using the system configuration module 111 illustrated in FIG. 9 and the rank of another failure affected device within the influence range may be divided according to the influence degree.

Next, visualization processing of the failure affected device at the time of the occurrence of the failure will be described in detail.

Figure 10:
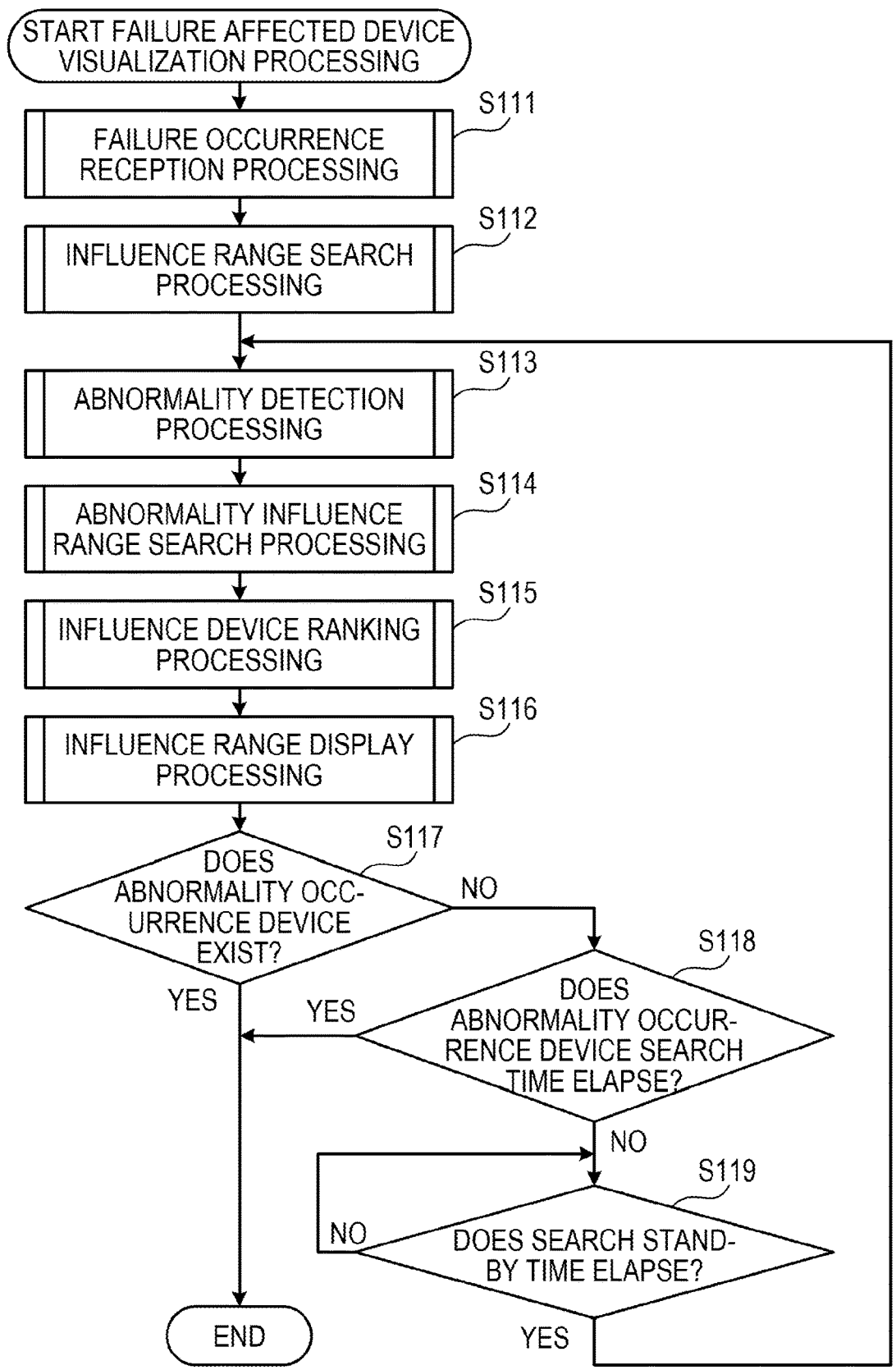
FIG. 10 is a flowchart illustrating an example of a visualization processing order of a failure affected device.

FIG. 10 is a flowchart illustrating an example of a visualization processing order of a failure affected device. Hereinafter, the processing illustrated in FIG. 10 will be described according to the step number.

(Step S111) The failure occurrence reception unit 132 performs failure occurrence reception processing based on automatic detection of the failure occurrence or input of failure information by a hand of another person. Details of the failure occurrence reception processing will be described below (see FIG. 12).

(Step S112) The influence search unit 133 performs an influence range search processing of searching for the influence range of the failure. By the influence range search processing, the failure affected device is extracted. The details of the influence range search processing will be described below (see FIG. 16).

(Step S113) The abnormality detection unit 134 performs abnormality detection processing for detecting a device in which operation abnormality actually occurs among the failure affected devices. By the abnormality detection processing, the abnormality occurrence device is extracted. The details of the abnormality detection processing will be described below (see FIG. 24).

(Step S114) The influence search unit 133 performs an abnormality influence range search processing of searching the influence range starting from the abnormality occurrence device. The details of the abnormality influence range search processing will be described below (see FIG. 27).

(Step S115) The affected device ranking unit 135 performs a ranking processing (affected device ranking processing) according to the influence degree for the failure affected device. By the affected device ranking processing, the rank of the influence degree is set for the failure affected device. The details of the affected device ranking processing will be described below (see FIG. 31).

(Step S116) The influence range display unit 136 performs an influence range display processing of displaying the influence range of the failure on the monitor 21 or the management terminal device 30. The details of the influence range display processing will be described below (see FIG. 34).

(Step S117) The abnormality detection unit 134 determines whether to detect at least one abnormality occurrence device in the abnormality detection processing of step S113. When the abnormality detection unit 134 may not detect the abnormality occurrence device, the abnormality detection unit 134 makes the processing proceed to step S118. Further, when the abnormality detection unit 134 may detect the abnormality occurrence device, the abnormality detection unit 134 terminates failure affected device rank dividing processing.

(Step S118) The abnormality detection unit 134 determines whether a predetermined search time of the abnormality occurrence device elapses after the failure occurs. The search time of the abnormality occurrence device is a time up to abandoning the detection of the abnormality occurrence device. For example, the search time is set to one hour in the abnormality detection unit 134. When the search time elapses, the abnormality detection unit 134 abandons the detection of the abnormality occurrence device and terminates the rank dividing processing of the failure affected device. When the search time does not elapse, the abnormality detection unit 134 makes the processing proceed to step S119.

(Step S119) The abnormality detection unit 134 determines whether a predetermined search stand-by time elapses after executing the previous abnormality detection processing. When the search stand-by time elapses, the abnormality detection unit 134 makes the processing proceed to step S113. When the search stand-by time does not elapse, the abnormality detection unit 134 repeats the processing of step S119 and stands by until the search stand-by time elapses.

The rank dividing of the failure affected device is performed according to such an order. Hereinafter, the details of the processing in each of steps S111 to S116 will be described in order.

<Failure Occurrence Reception Processing>

Hereinafter, the failure occurrence reception processing will be described with reference to FIGS. 11 and 12.

Figure 11:
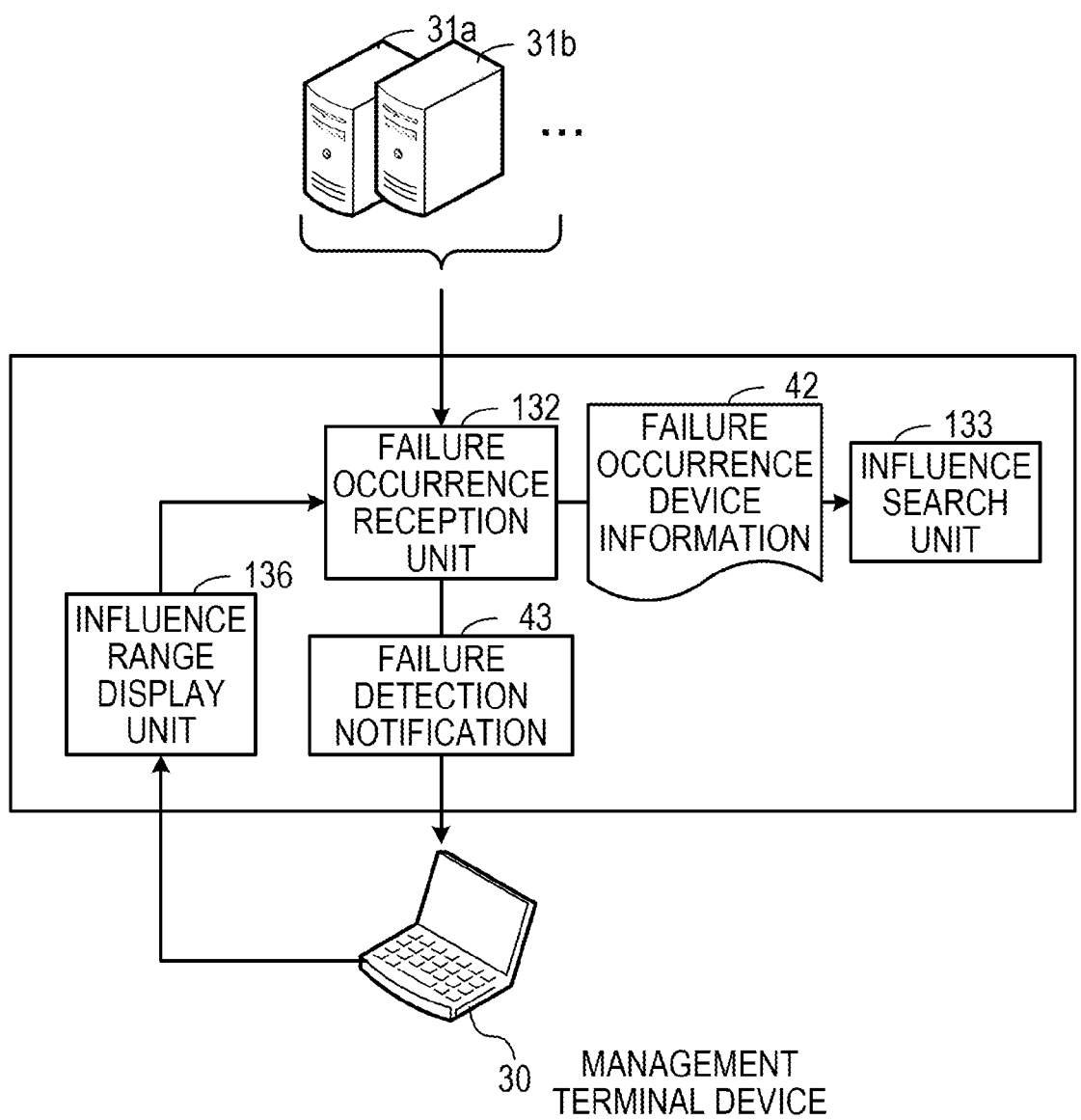
FIG. 11 is a diagram illustrating an example of failure occurrence reception processing.

FIG. 11 is a diagram illustrating an example of failure occurrence reception processing.

There are two methods for detecting the occurrence of the failure. In a first failure occurrence detection method, the failure occurrence reception unit 132 monitors the devices including the servers 31*a*, 31*b*, . . . , to be managed and automatically detects the occurrence of the failure. For example, the failure occurrence reception unit 132 periodically communicates with the device to be managed and collects error information. In addition, the failure occurrence reception unit 132 identifies a device that outputs the error information as the failure occurrence device. Further, the failure occurrence reception unit 132 periodically transmits an occurrence confirmation command (e.g., ping) to the device to be managed and identifies a device that does not return a response within a predetermined period as the failure occurrence device. The failure occurrence reception unit 132 transmits the failure occurrence device information 42 indicating a specific failure occurrence device to the influence search unit 133. Further, the failure occurrence reception unit 132 transmits a failure detection notification indicating that the failure occurs, for example, to the management terminal device 30 by e-mail.

In a second failure occurrence detection method, the occurrence of the failure is detected by inputting the failure occurrence from the management terminal device 30. For example, the operator of the system may notice the occurrence of the failure in any one device. Further, the operator is aware of the occurrence of the failure in any one device by using the service and the user of the service may inform the operator of the system of the occurrence of the failure. In these cases, the operator communicates with the influence range display unit 136 by, for example, the management terminal device 30. In addition, when an administrator inputs the device name of the failure occurrence device in the management terminal device 30, the device name is transmitted from the management terminal device 30 to the influence range display unit 136. Upon receiving the device name of the failure occurrence device, the influence range display unit 136 transmits the received device name of the failure occurrence device to the failure occurrence reception unit 132. Upon receiving the device name of the failure occurrence device, the failure occurrence reception unit 132 recognizes that the failure occurs in the device and transmits the failure occurrence device information 42 to the influence search unit 133.

Figure 12:
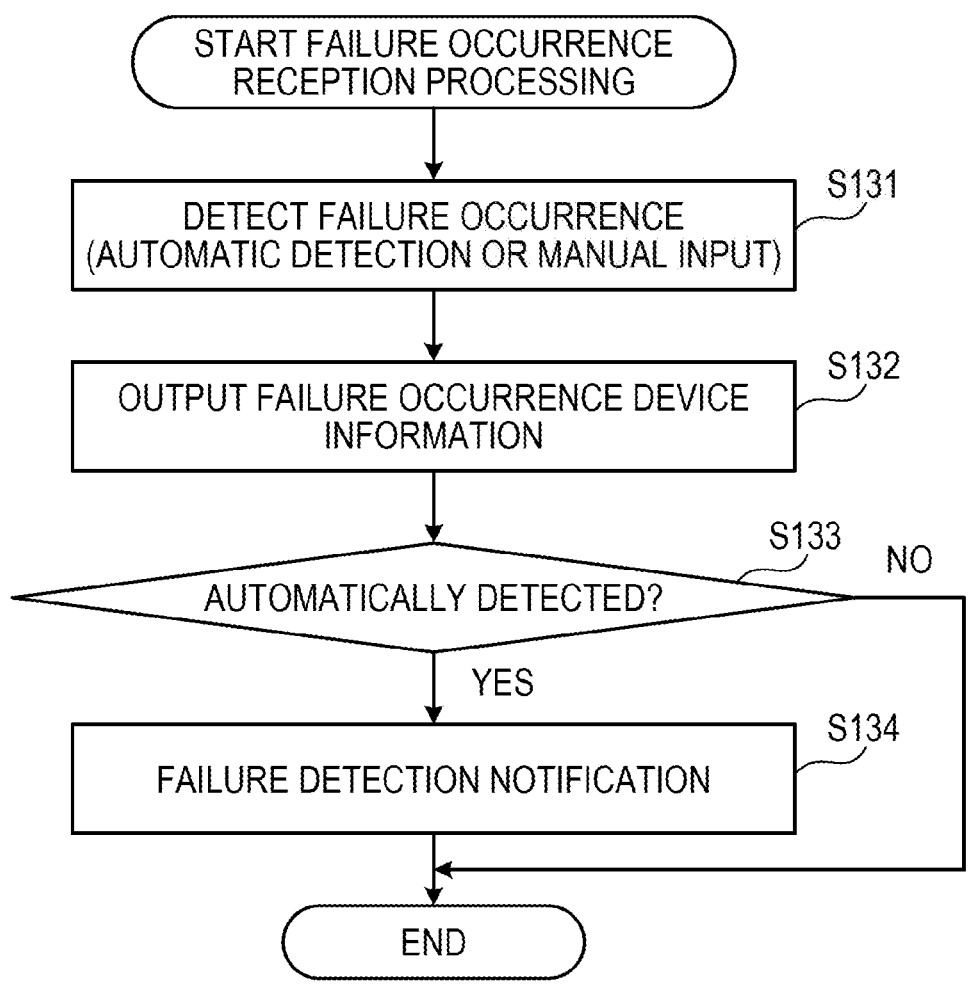
FIG. 12 is a flowchart illustrating an example of a failure occurrence reception processing order.

FIG. 12 is a flowchart illustrating an example of a failure occurrence reception processing order. Hereinafter, the processing illustrated in FIG. 12 will be described according to a step number.

(Step S131) The failure occurrence reception unit 132 detects the occurrence of the failure in any one device. When the occurrence of the failure is detected, the occurrence of the failure may be automatically detected and information indicating that the failure occurs may be manually input. When the occurrence of the failure is automatically detected, the failure occurrence reception unit 132 acquires the device name of the device in which the failure occurs and stores a current time as the failure occurrence time. Further, when the occurrence of the failure is manually input, the failure occurrence reception unit 132 receives the inputs of the device name of the device in which the failure occurs and the failure occurrence time.

(Step S132) The failure occurrence reception unit 132 outputs the failure occurrence device information 42 to the influence search unit 133.

(Step S133) The failure occurrence reception unit 132 determines whether to automatically detect the occurrence of the failure. When the occurrence of the failure is automatically detected, the failure occurrence reception unit 132 makes the processing proceeds to step S134. When the occurrence of the failure is not automatically detected, the failure occurrence reception unit 132 terminates the failure occurrence reception processing.

(Step S134) The failure occurrence reception unit 132 transmits a failure detection notification to the management terminal device 30. For example, the failure occurrence reception unit 132 transmits an email indicating the failure detection notification to an e-mail address of the operator. The transmitted failure detection notification is temporarily stored in an e-mail server (not illustrated). The management terminal device 30 receives the failure detection notification from the e-mail server at a predetermined timing.

The failure occurrence reception unit 132 detects the occurrence of the failure as described above, and as a result, the failure occurrence device information 42 indicating the device in which the failure occurs is transmitted to the influence search unit 133. Then, the influence search unit 133 executes the influence range search processing.

<Influence Range Search Processing>

Hereinafter, the influence range search processing will be described with reference to FIGS. 13 to 19.

Figure 13:
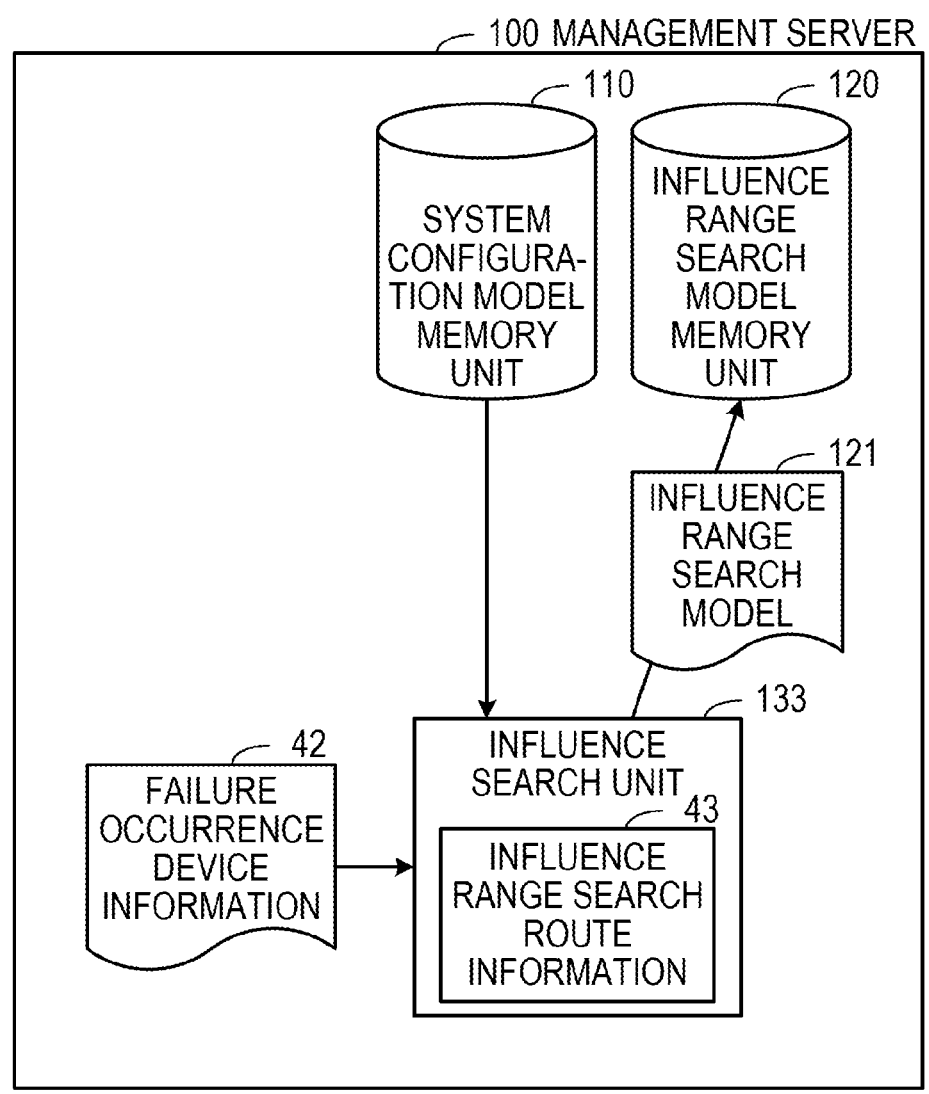
FIG. 13 is a diagram illustrating an example of influence range search processing.

FIG. 13 is a diagram illustrating an example of influence range search processing. The influence search unit 133 has influence range search route information 43. In the influence range search route information 43, a search route of the influence range due to a cause of the failure is set for each function of the device. Upon receiving the failure occurrence device information 42, the influence search unit 133 extracts the failure affected device based on the predefined influence range search route information 43 by referring to the system configuration model 111. The influence search unit 133 creates the influence range search model 121 based on the extracted failure affected device. In addition, the influence search unit 133 stores the created influence range search model 121 in the influence range search model memory unit 120.

FIG. 14 is a diagram illustrating an example of influence range search route information. The influence range search route information 43 includes, for example, a failure/search route correspondence table 43*a* and search route information 43*b*. In the failure/search route correspondence table 43*a*, a search route number uniquely indicating the search route is set in association with a combination of the function and the type of the failure of the device. The type of failure is, for example, the type of resource causing the failure, such as a disk related failure or a CPU related failure.

In the search route information 43*b*, for each search route number, the search route corresponding to the search route number is indicated. The search route is indicated by an array of the functions of the devices which search the influence ranges. For example, the search route indicated in "search route #1" is "VM→Datastore→RAID→Datastore→VM". In this search route, it is first indicated that the function is to start searching the device "VM". Next, it is indicated that a device connected to the device "VM" and having a function of "Datastore" is searched. When the corresponding device may be detected, the device having the corresponding function is searched among devices connected to a device which is last detected in the order indicated in the search route.

Figure 15:
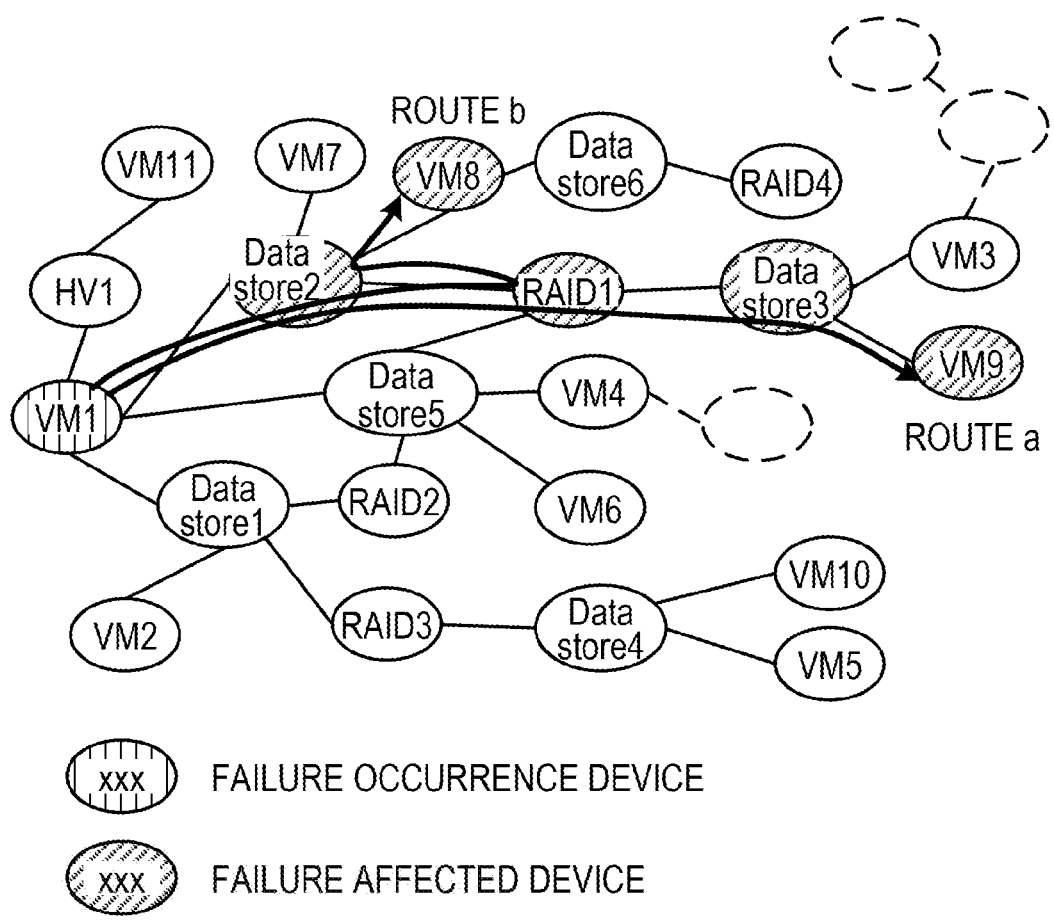
FIG. 15 is a diagram illustrating an example of influence range search.

FIG. 15 is a diagram illustrating an example of influence range search. For example, it is assumed that the cause of the failure is related to disk and the device having the device name "VM1" is the failure occurrence device. In this case, the function of the failure occurrence device is "VM". Then, according to the failure/search route correspondence table 43*a* illustrated in FIG. 14, "search route #1" is determined as the search route. Therefore, from the device "VM1" as the starting point, the influence range search is performed according to the search route "search route #1" indicated in the search route information 43*b*.

First, in the system configuration indicated in the system configuration model 111, the device having the function "Datastore" is searched among the devices connected to the device "VM1". Then, for example, the device "Datastore2" is detected. Next, among the devices connected to the device "Datastore2", a device having the function "RAID" is searched. Then, for example, the device "RAID1" is detected. Next, among the devices connected to the device "RAID1", a device having the function "Datastore" is searched. Then, for example, the device "Datastore2" and the device "Datastore3" are detected. Next, among the devices connected to the device "Datastore2", the device having the function "VM" is searched and among the devices connected to the device "Datastore3", the device having the function "VM" is searched. Then, for example, a device "VM8" connected to the device "Datastore2" and a device "VM9" connected to the device "Datastore3" are detected.

As a result, a route a "VM1→Datastore2→RAID1→Datastore3→VM9" and a route b "VM1→Datastore2→RAID1→Datastore2→VM8" are detected. As indicated by the route b, it is also permitted to return the route once traced reversely when the route is traced from the failure occurrence device as the starting point.

In FIG. 15, only a search example via the device "Datastore2" is illustrated among the devices having the function "Datastore", which is connected to the device "VM1", but searching via the device "Datastore1" is also performed.

The search route "search route #1", searching via the device having the function "HV" is not performed. In addition, devices having the function "Datastore", which does not share the device having the function "RAID" are not searched.

Figure 16:
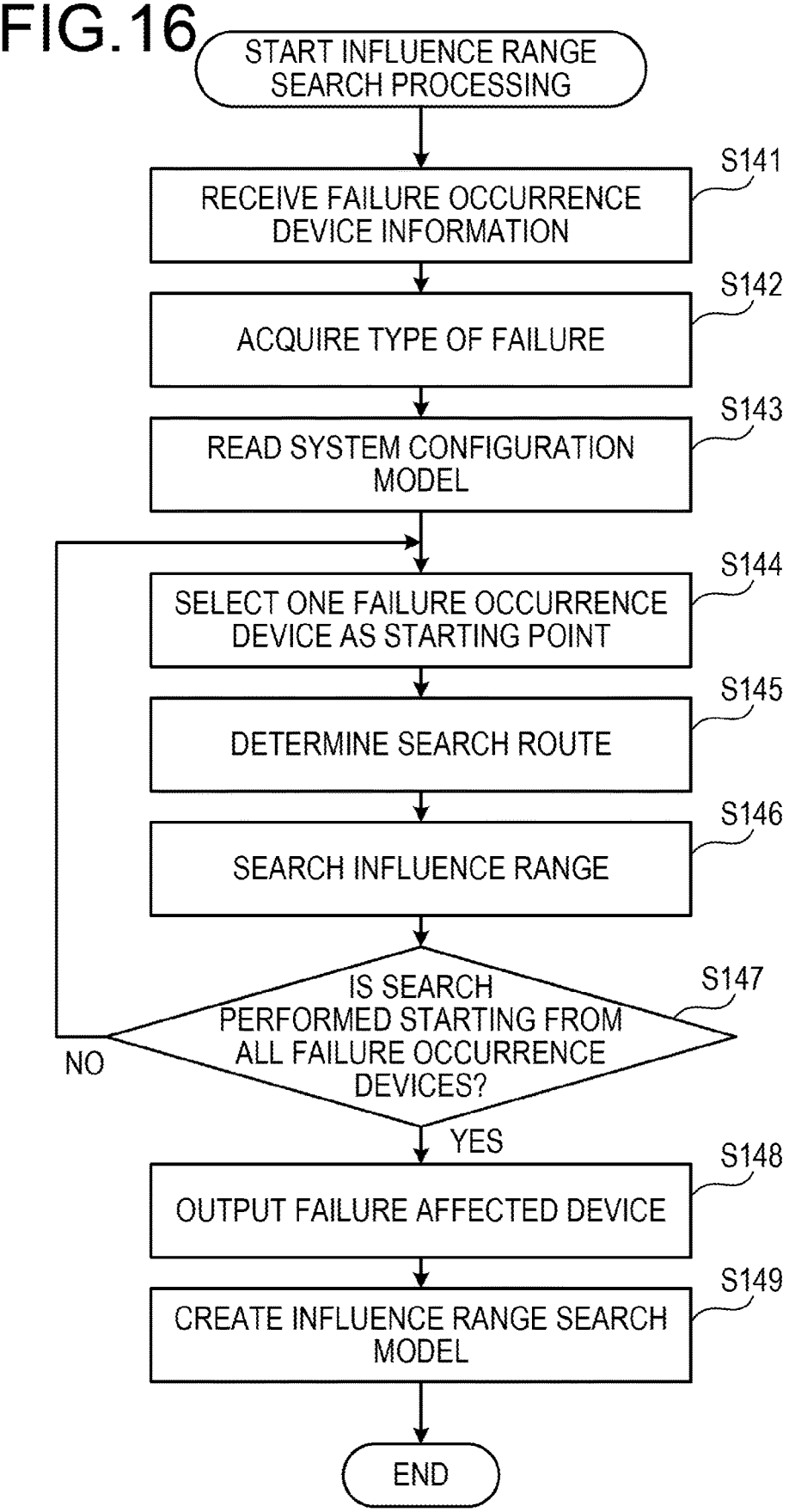
FIG. 16 is a flowchart illustrating an example of an influence range search processing order.

Based on such influence range search route information 43, the influence range of the failure is searched. FIG. 16 is a flowchart illustrating an example of an influence range search processing order. Hereinafter, the processing illustrated in FIG. 16 will be described according to the step number.

(Step S141) The influence search unit 133 receives the failure occurrence device information 42. The failure occurrence device information 42 includes, for example, the device name and the failure occurrence time of each of one or a plurality of devices having the failure.

(Step S142) The influence search unit 133 acquires the type of failure. For example, the influence search unit 133 acquires from the management terminal device 30 the type of failure input in the management terminal device 30 by the operator. Further, when the failure occurrence reception unit 132 detects the occurrence of the failure, in the case where the type of failure is also identified, the failure occurrence reception unit 132 may include the type of failure in the failure occurrence device information 42. For example, when information indicating the type of failure is included in the error information acquired at the time of the automatic detection of the failure, the failure occurrence reception unit 132 includes the type of failure in the failure occurrence device information 42.

(Step S143) The influence search unit 133 reads the system configuration model 111 from the system configuration model memory unit 110. In this case, the influence search unit 133 sets "1" in a failure occurrence flag of the failure occurrence device in the read system configuration model 111.

(Step S144) The influence search unit 133 selects one of the failure occurrence devices that are not selected among the failure occurrence devices indicated in the failure occurrence device information 42 as the failure occurrence device which is the starting point.

(Step S145) The influence search unit 133 determines the search route for searching the influence range based on the influence range search route information 43.

(Step S146) The influence search unit 133 searches the influence range starting from the failure occurrence device according to the determined search route. In this case, the influence search unit 133 adds "1" to the influence degree of the device other than the failure occurrence device on the route detected by the search in the system configuration model 111.

(Step S147) The influence search unit 133 determines whether the search using all failure occurrence devices as the starting point is completed. When searching all failure occurrence devices is completed, the influence search unit 133 makes the processing proceed to step S148. Further, when there is a failure occurrence device which is not searched, the influence search unit 133 makes the processing proceed to step S144.

(Step S148) The influence search unit 133 outputs the device detected by searching the influence range as the failure affected device.

(Step S149) The influence search unit 133 creates the influence range search model 121 based on the failure affected device.

As described above, the search of the influence range starting from the failure occurrence device is performed, and as a result, the failure affected device is detected.

Figure 17:
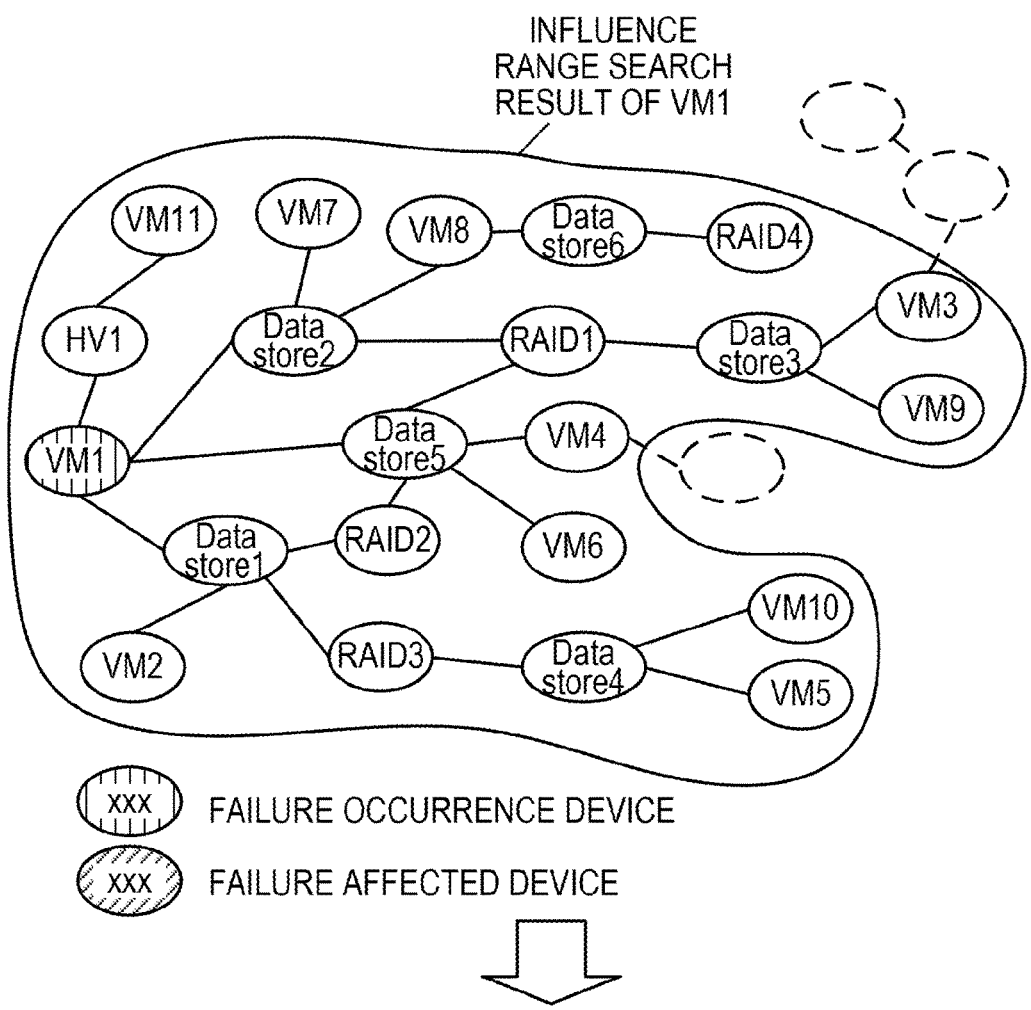
FIG. 17 is a first diagram illustrating a search example of an influence range starting from a failure occurrence device.

FIG. 17 is a first diagram illustrating a search example of an influence range starting from a failure occurrence device. When the device "VM1" is detected as the failure occurrence device, "1" is set in the failure occurrence flag of the device "VM1" in the system configuration model 111. Herein, it is assumed to be determined that the failure type is the "disk related failure" and the search route is the "search route #1".

Figure 18:
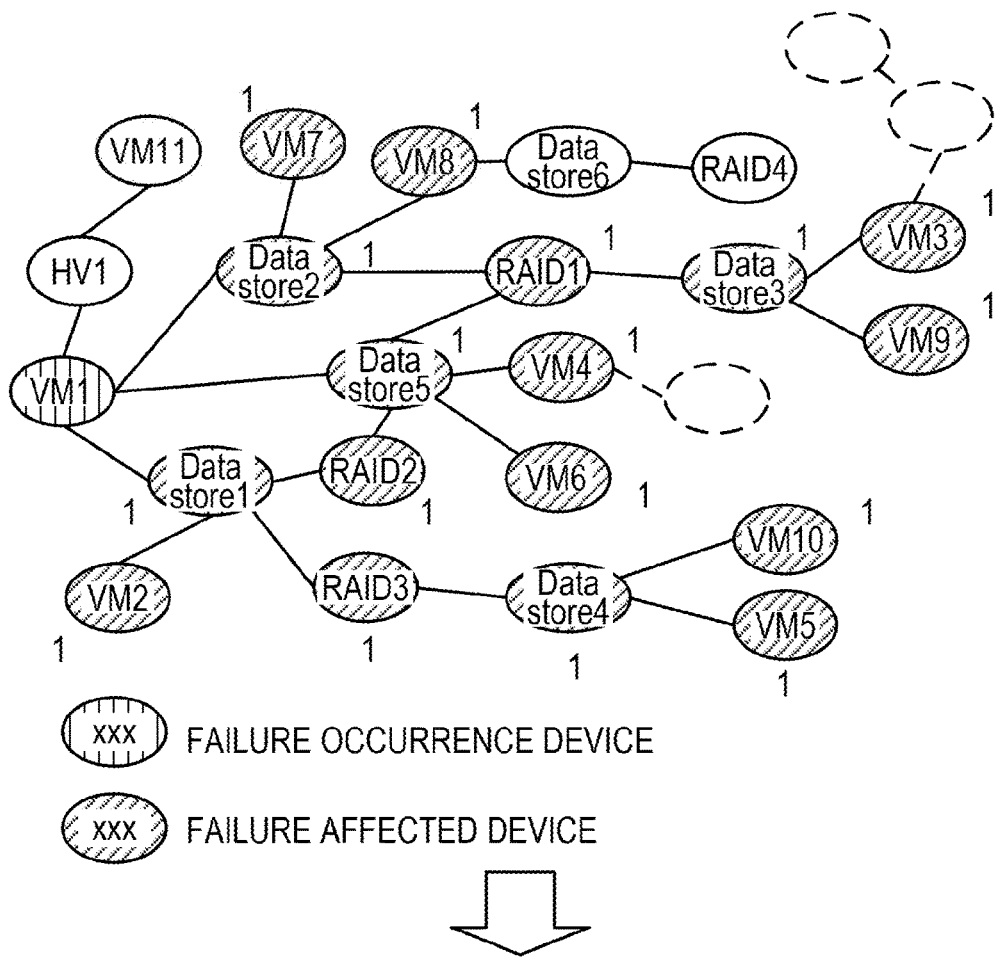
FIG. 18 is a second diagram illustrating the search example of the influence range starting from the failure occurrence device.

FIG. 18 is a second diagram illustrating the search example of the influence range starting from the failure occurrence device. As a result of performing the search by the search route "search route #1" starting from the device "VM1", the failure affected device is detected. In addition, "1" is set as the degree of influence of the failure affected device in the system configuration model 111. In FIG. 18, a numerical value indicating the influence degree of the failure affected device is illustrated in the vicinity of the node representing the failure affected device.

Figure 19:
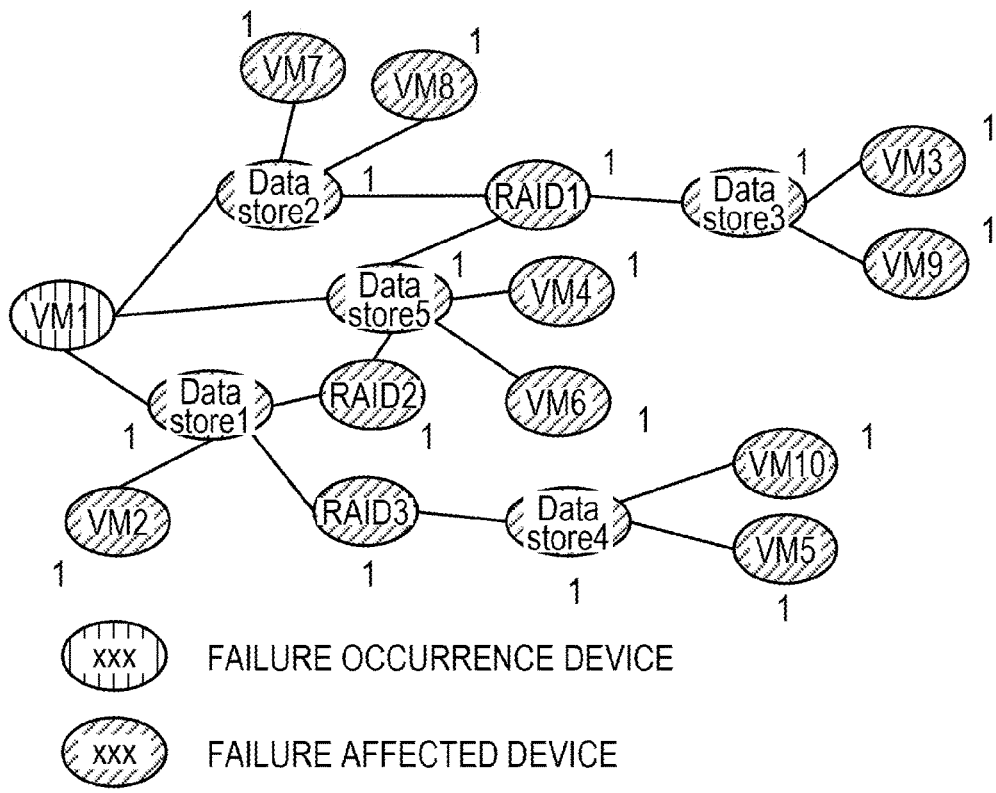
FIG. 19 is a third diagram illustrating the search example of the influence range starting from the failure occurrence device.

FIG. 19 is a third diagram illustrating the search example of the influence range starting from the failure occurrence device. From the system configuration indicated in the system configuration model 111, the influence range search model 121 is created by excluding devices that are neither the failure occurrence device nor the failure affected device. In addition, the influence range search model 121 is stored in the influence range search model memory unit 120.

The influence range search starting from the failure occurrence device is completed, and as a result, the device that may be affected by the failure is identified as the failure affected device. However, at this stage, the superiority or inferiority of the influence degree of the failure is not determined. Therefore, by the abnormality detection processing, a device which actually undergoes a predetermined influence is determined among the failure affected devices.

In the examples of FIGS. 17 to 19, there is only one failure occurrence device, but there may be a plurality of failure occurrence devices. In that case, in the system configuration model 121 illustrated in FIG. 19, "1" is set as the failure occurrence flags of a plurality of devices. Further, when there is the plurality of failure occurrence devices, the failure affected devices within the influence range are searched from each failure occurrence device and "1" is added to the influence degree of each device within the influence range for each search. For this reason, the influence degree of the failure affected device existing within the influence range of the plurality of failure occurrence devices is a value of "2" or more. For example, in the case of two failure occurrence devices, the influence degree of the failure affected device existing in the influence range of only one of the failure occurrence devices is "1" and the influence degree of the failure affected device existing in the influence range of both failure occurrence devices is "2".

<Abnormality Detection Processing>

Hereinafter, the abnormality detection processing will be described with reference to FIGS. 20 to 25.

Figure 20:
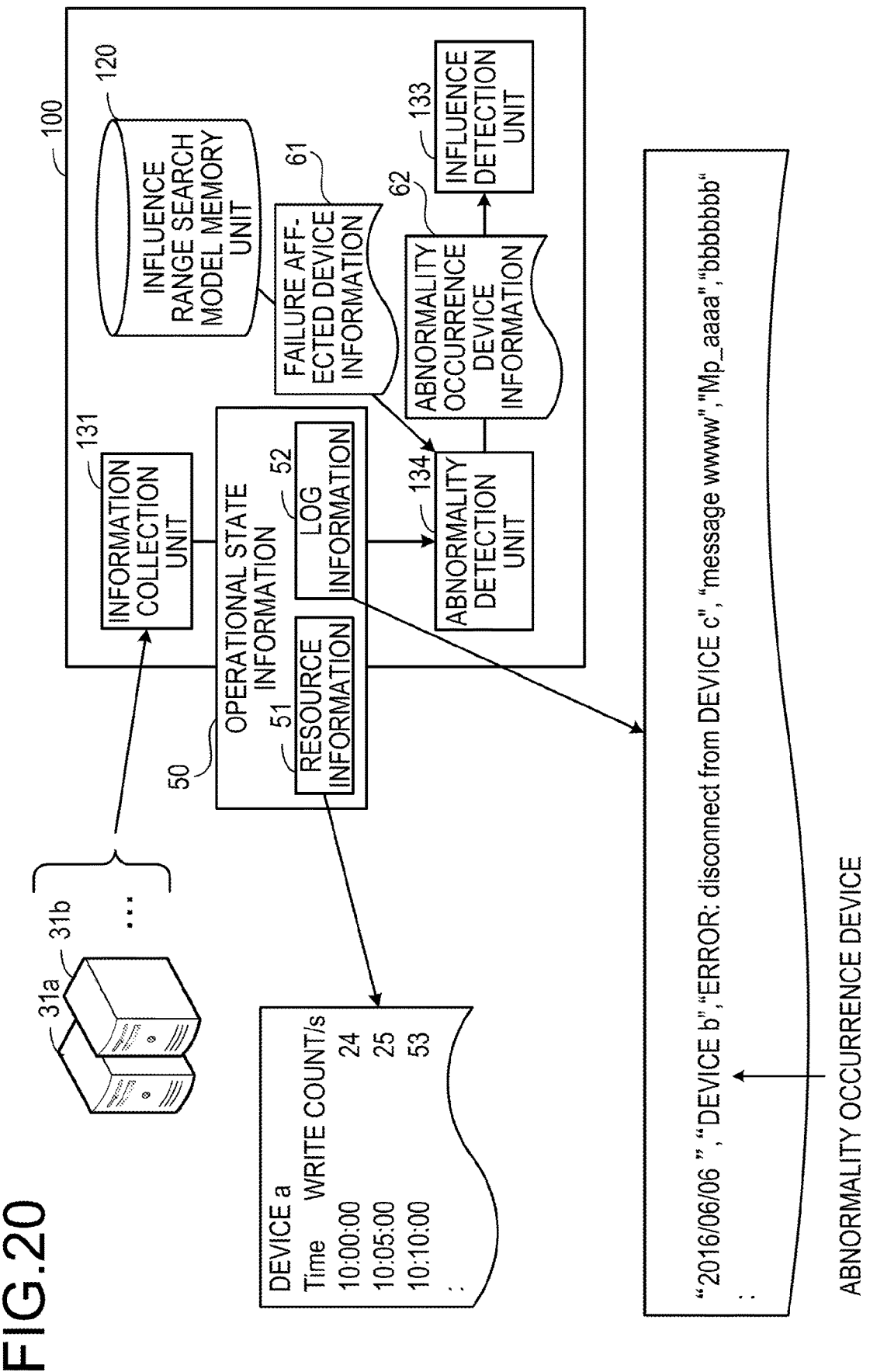
FIG. 20 is a diagram illustrating an example of abnormality detection processing.

FIG. 20 is a diagram illustrating an example of abnormality detection processing. The abnormality detection unit 134 acquires failure affected device information 61 indicating the failure affected device by referring to the influence range search model 121 in the influence range search model memory unit 120. In addition, the abnormality detection unit 134 requests the information collection unit 131 to collect operational state information 50 of the failure affected device. Then, the information collection unit 131 acquires the operational state information 50 from each of the failure affected devices and transmits the acquired operational state information 50 to the abnormality detection unit 134.

The operational state information 50 includes, for example, at least any one of the resource information 51 and the log information 52. The resource information 51 is information indicating the usage situation of the resource of the failure affected device. For example, the resource information 51 includes a time change of a CPU usage rate, a time change of a memory usage rate, and a time change of a write count per unit time of the disk. Further, only resource information corresponding to the failure type may be acquired as the resource information 51. For example, when the failure type is the disk related failure, the information collection unit 131 acquires the time change of the write count per unit time of the disk as the resource information 51. The log information 52 is information indicating a log of an event which occurs in the failure affected device. The log information 52 includes, for example, an error log indicating an error which occurs in the failure affected device.

The abnormality detection unit 134 extracts the abnormality occurrence device that is actually affected by the failure based on the operational state information 50 of each of the failure affected devices. The abnormality detection unit 134 transmits the failure occurrence device information 62 indicating the abnormality occurrence device to the influence search unit 133.

Figure 21:
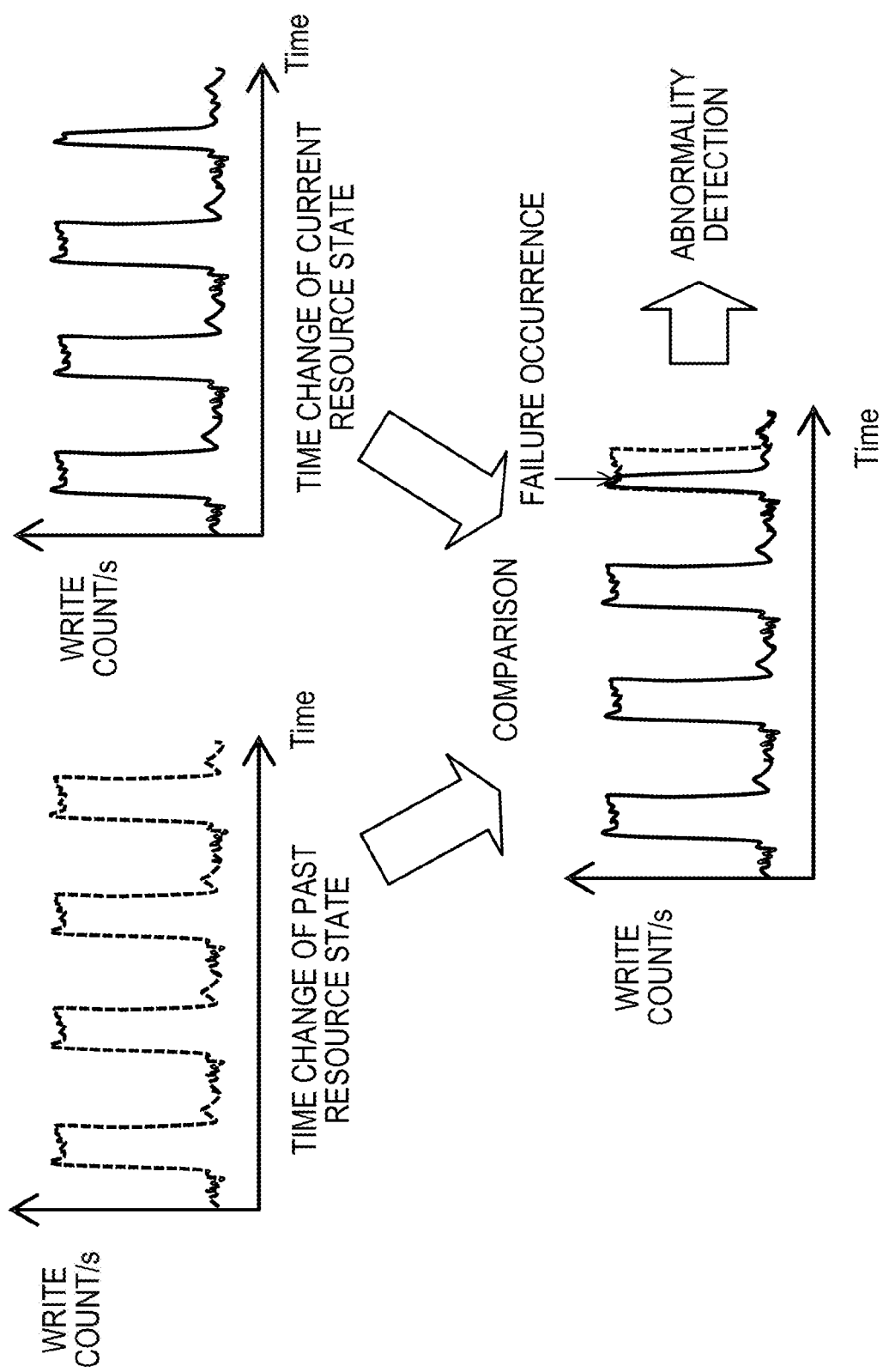
FIG. 21 is a diagram illustrating a first example of abnormality detection using resource information.

Herein, an abnormality detection method using resource information will be described with reference to FIGS. 21 to 23. FIG. 21 is a diagram illustrating a first example of abnormality detection using resource information. For example, when there is periodicity in a state of the resource of the device, the abnormality detection unit 134 acquires resource information related to the failure type of each failure affected device and compares the time changes of the resource state between a failure occurrence time zone and a past correspondence period. When the failure occurrence time zone and the past correspondence period are different from each other in terms of a method of the time change of the resource state of the failure affected device, the abnormality detection unit 134 outputs the failure affected device as the abnormality occurrence device.

The time change of the past resource state is, for example, to average the time change of the resource state for a past predetermined period. For example, a similar time change in the resource state may be repeated in a one-day period. In this case, the abnormality detection unit 134 acquires resource information for one day of each device via the information collection unit 131 every day. In addition, the abnormality detection unit 134 calculates the time change of an average daily resource state from the resource state of each day and stores the calculation result in the storage device 103. When the failure is detected and the abnormality detection processing starts, the abnormality detection unit 134 acquires the time change of the average daily resource state from the storage device as the time change of the past resource state and compares the acquired time change with the time change of a current resource state.

For example, the abnormality detection unit 134 compares the time change between the past and current resource states during a predetermined period including the failure occurrence time. For example, when the failure occurrence time is "12:00", the time changes are compared with respect to a time zone of 1 hour of "11:30 to 12:30" before and after 30 minutes. For example, the abnormality detection unit 134 compares the time change of the resource state using a statistical verification method and when a significant difference of a predetermined value or more is recognized, the abnormality detection unit 134 determines that the failure affected device to be determined is affected by the failure.

The abnormality detection unit 134 compares average values of the resource states in time zones to be compared and when there is the significant difference of the predetermined value or more between the past average value and the current average value, the abnormality detection unit 134 may determine that the failure affected device to be determined is affected by the failure. In that case, for example, when a value obtained by dividing a current average value by a past average value is out of the range of "0.6 to 1.4", it is determined that the failure affected device to be determined is affected by the failure.

In the example of FIG. 21, a state where the write count per second is normally high continues before and after the failure occurrence time and thus, in a current state, the write count per second decreases based on the failure occurrence time. Therefore, it is determined that there is an abnormality due to the influence of the failure in the failure affected device to be determined.

Figure 22:
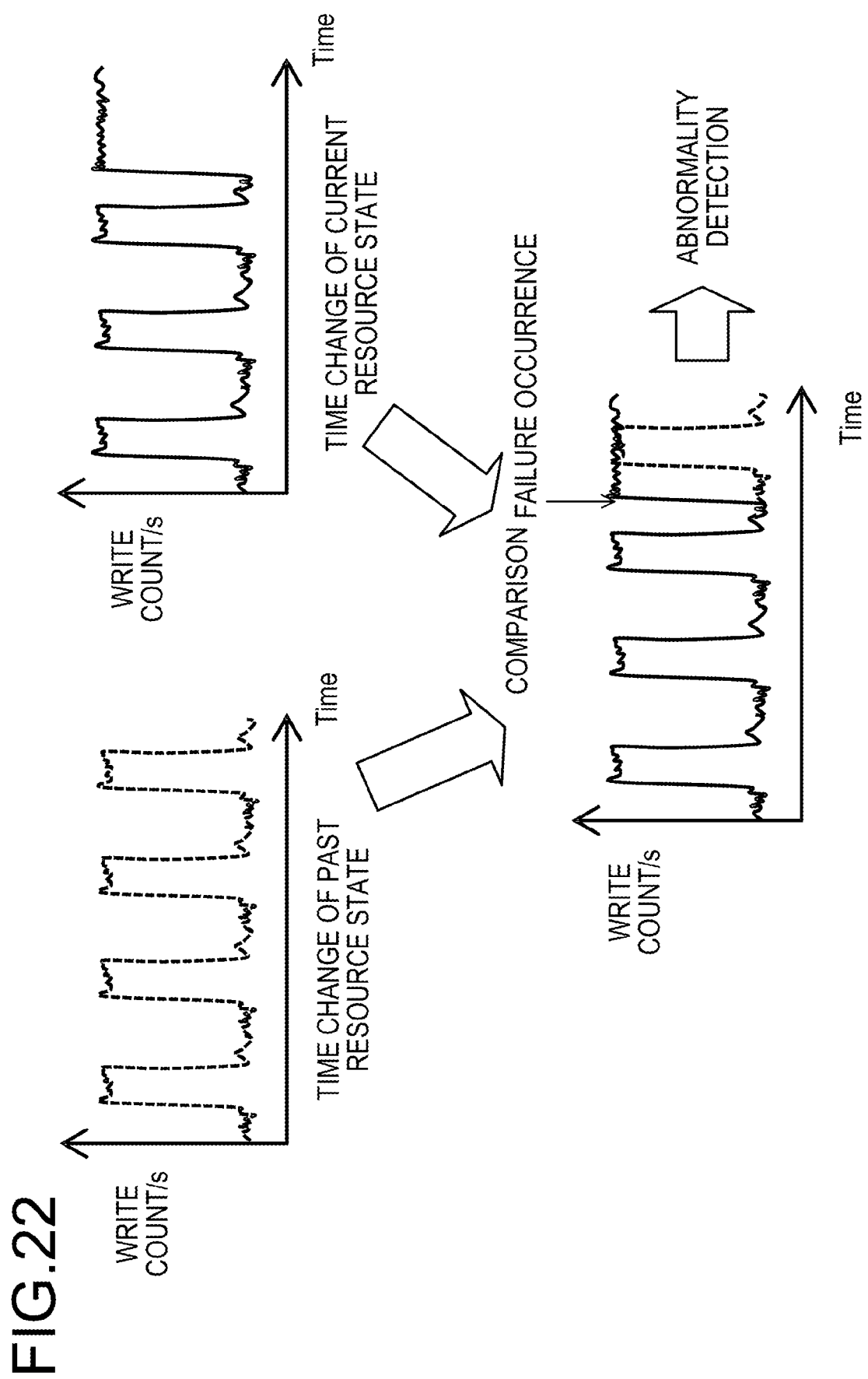
FIG. 22 is a diagram illustrating a second example of the abnormality detection using the resource information.

FIG. 22 is a diagram illustrating a second example of the abnormality detection using the resource information. In the example of FIG. 22, a state where the write count per second is normally low continues before and after the failure occurrence time and thus, in the current state, the write count per second increases based on the failure occurrence time. Therefore, it is determined that there is an abnormality due to the influence of the failure in the failure affected device to be determined.

Figure 23:
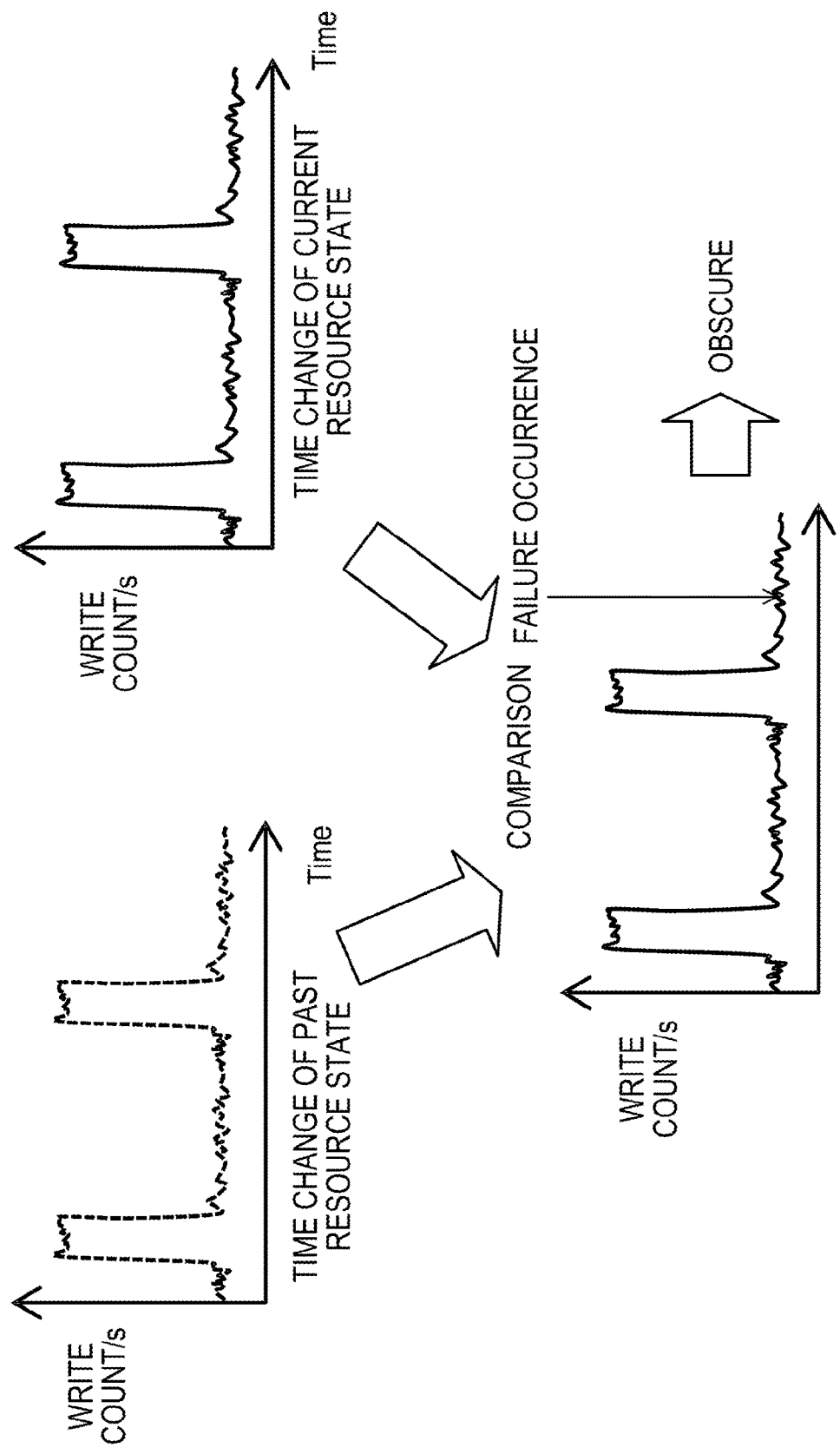
FIG. 23 is a diagram illustrating a third example of the abnormality detection using the resource information.

FIG. 23 is a diagram illustrating a third example of the abnormality detection using the resource information. In the example of FIG. 23, the write count per second is almost close to 0 and a load is not applied both before and after the failure occurrence time both in the past and before and after the failure occurrence time (e.g., the application program is not executed). As described above, also in the past, when no load is applied even before and after the failure occurrence time, the abnormality detection unit 134 determines that it is unclear whether the influence of the failure is exerted on the failure affected device to be determined.

As described above, by using the resource information, abnormality detection is performed with respect to in the failure affected device.

In the case where the abnormality is detected based on the log information 52, for example, the abnormality detection unit 134 may set a device that outputs the error message within a predetermined period before and after the failure occurrence time as the abnormality occurrence device. Further, the abnormality detection unit 134 may also determine the abnormality occurrence device based on the total number of log outputs within the predetermined period. For example, when there is periodicity in the time change of the log output number, the abnormality detection unit 134 compares the number of log outputs within a predetermined period including the time of the failure occurrence with the number (an average value of a plurality of corresponding periods) of log outputs within the corresponding period in the past. In addition, when the difference (or change rate) in the number of log outputs is equal to or larger than a predetermined value, the abnormality detection unit 134 determines that the failure affected device to be determined is affected by the failure. For example, when the number of log outputs increases at a rate equal to or greater than a predetermined value, the abnormality detection unit 134 may use the device described in the increased log as the abnormality occurrence device.

Figure 24:
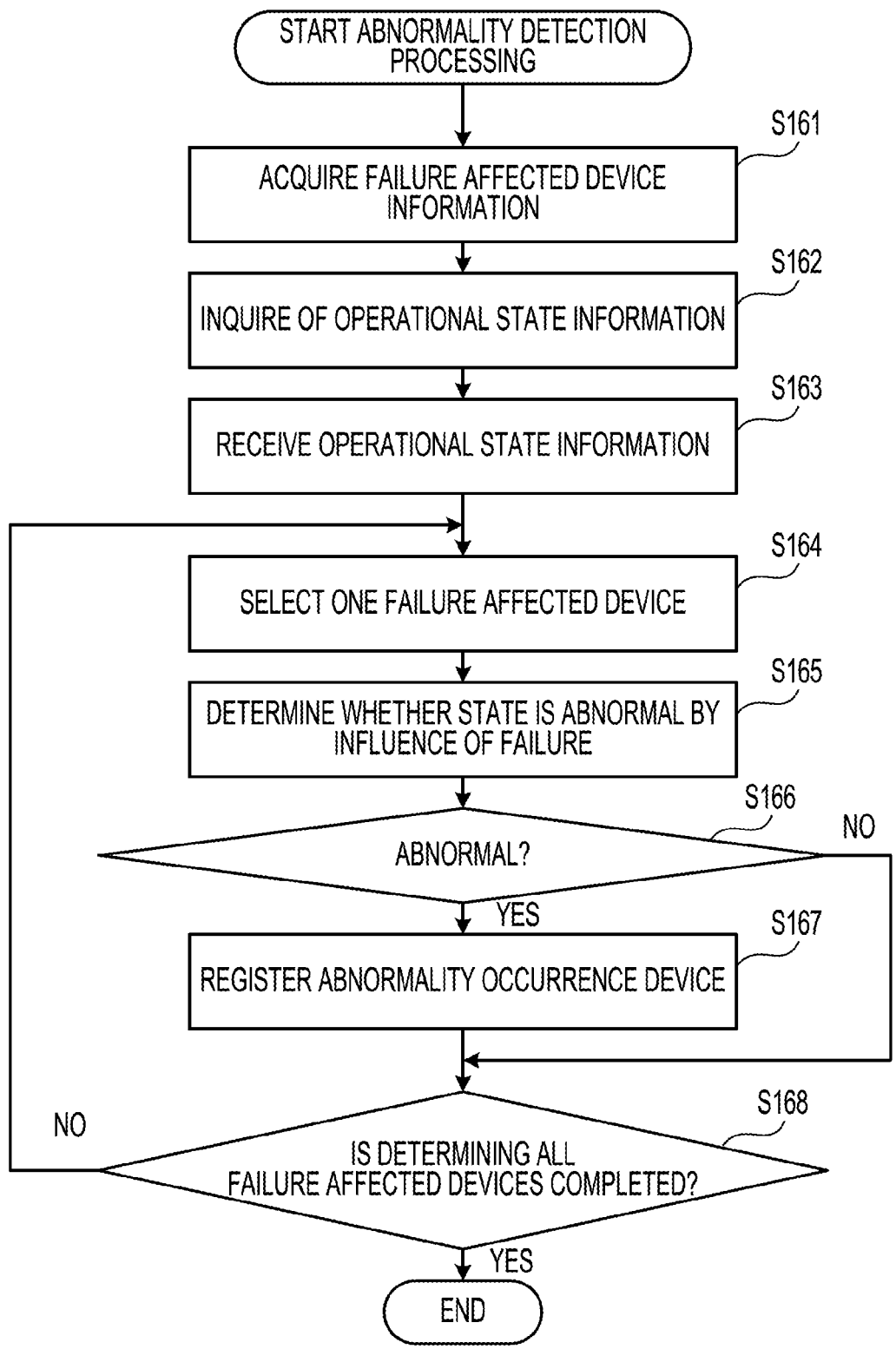
FIG. 24 is a flowchart illustrating an example of an abnormality detection processing order.

FIG. 24 is a flowchart illustrating an example of an abnormality detection processing order. Hereinafter, the processing illustrated in FIG. 24 will be described according to the step number.

(Step S161) The abnormality detection unit 134 acquires the failure affected device information 61 indicating the failure affected device from the influence range search model 121 in the influence range search model memory unit 120.

(Step S162) The abnormality detection unit 134 inquires of the information collection unit 131 about the operational state information 50. The inquiry includes the device name of the failure affected device. Then, the information collection unit 131 acquires the operational state information 50 from the failure affected device during a predetermined period before and after the failure occurrence time and transmits the operational state information to the abnormality detection unit 134.

(Step S163) The abnormality detection unit 134 receives the operational state information.

(Step S164) The abnormality detection unit 134 regards and selects one of the failure affected devices that are not to be determined yet as a determination target.

(Step S165) The abnormality detection unit 134 determines the presence or absence of state abnormality due to the influence of the failure in the failure affected device based on the operational state information acquired from the selected failure affected device.

(Step S166) When the abnormality detection unit 134 determines that there is the abnormality, the abnormal detection unit 134 makes the processing proceed to step S167. Further, when the abnormality detection unit 134 determines that there is no abnormality, the abnormal detection unit 134 makes the processing proceed to step S168.

(Step S167) The abnormality detection unit 134 registers the selected failure affected device as the abnormality occurrence device. For example, the abnormality detection unit 134 sets "1" in the failure occurrence flag of the selected failure affected device in the influence range search model 121. In this case, in the influence range search model 121, a device having the failure occurrence flag of "1" and a value of the influence degree of "1" or more is the abnormality occurrence device.

(Step S168) The abnormality detection unit 134 determines whether the determination of the presence or absence of the state abnormality is completed with respect to all failure affected devices. When the determination is completed with respect to all of the failure affected devices, the abnormality detection unit 134 terminates the abnormality detection processing. Further, when there is the failure affected device which is not yet determined, the abnormality detection unit 134 makes the processing proceed to step S164.

In this way, the abnormality occurrence device is detected among the failure affected devices.

Figure 25:
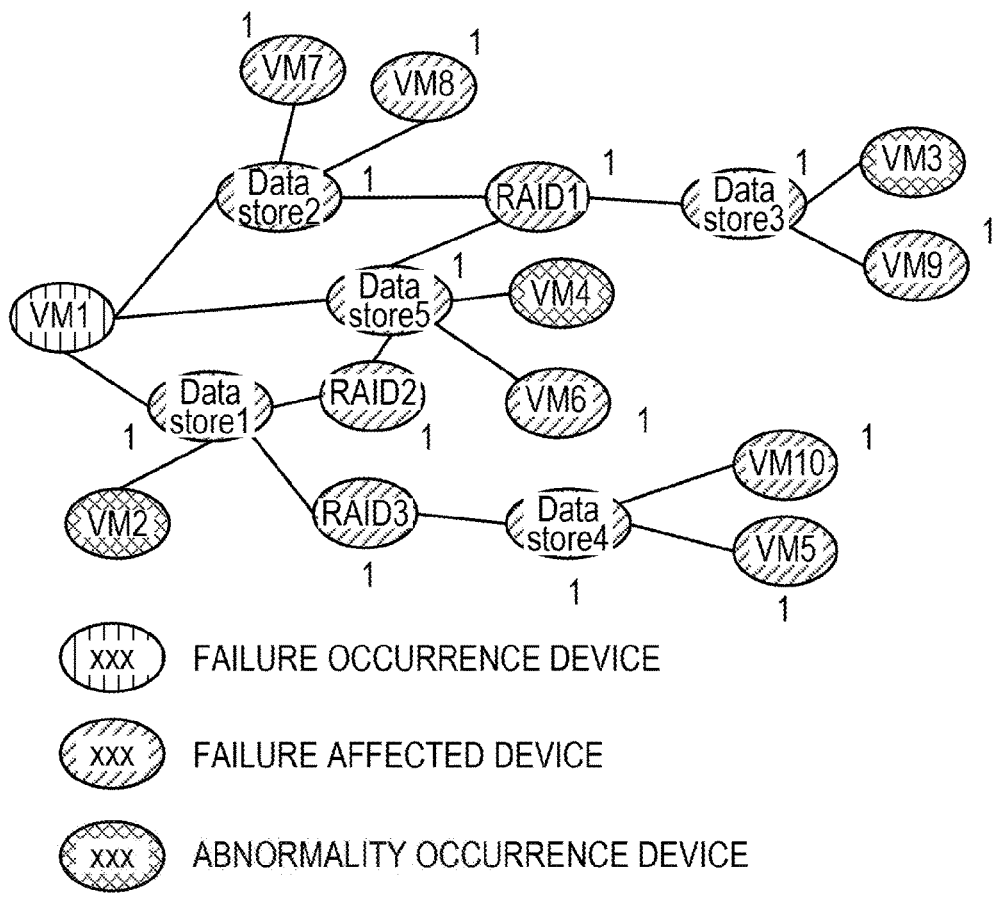
FIG. 25 is a diagram illustrating an example of a detection result of the abnormality occurrence device.

FIG. 25 is a diagram illustrating an example a detection result of the abnormality occurrence device. In the example of FIG. 25, the devices "VM2", "VM3", and "VM4" are determined as the abnormality occurrence devices. In the influence range search model 121, "1" is set in the failure occurrence flag of the device determined as the abnormality occurrence device.

In this way, when the abnormality occurrence device is detected, the influence range is searched again starting from the abnormality occurrence device.

<Abnormality Influence Range Search Processing>

Hereinafter, the abnormality influence range search processing will be described with reference to FIGS. 26 to 29.

Figure 26:
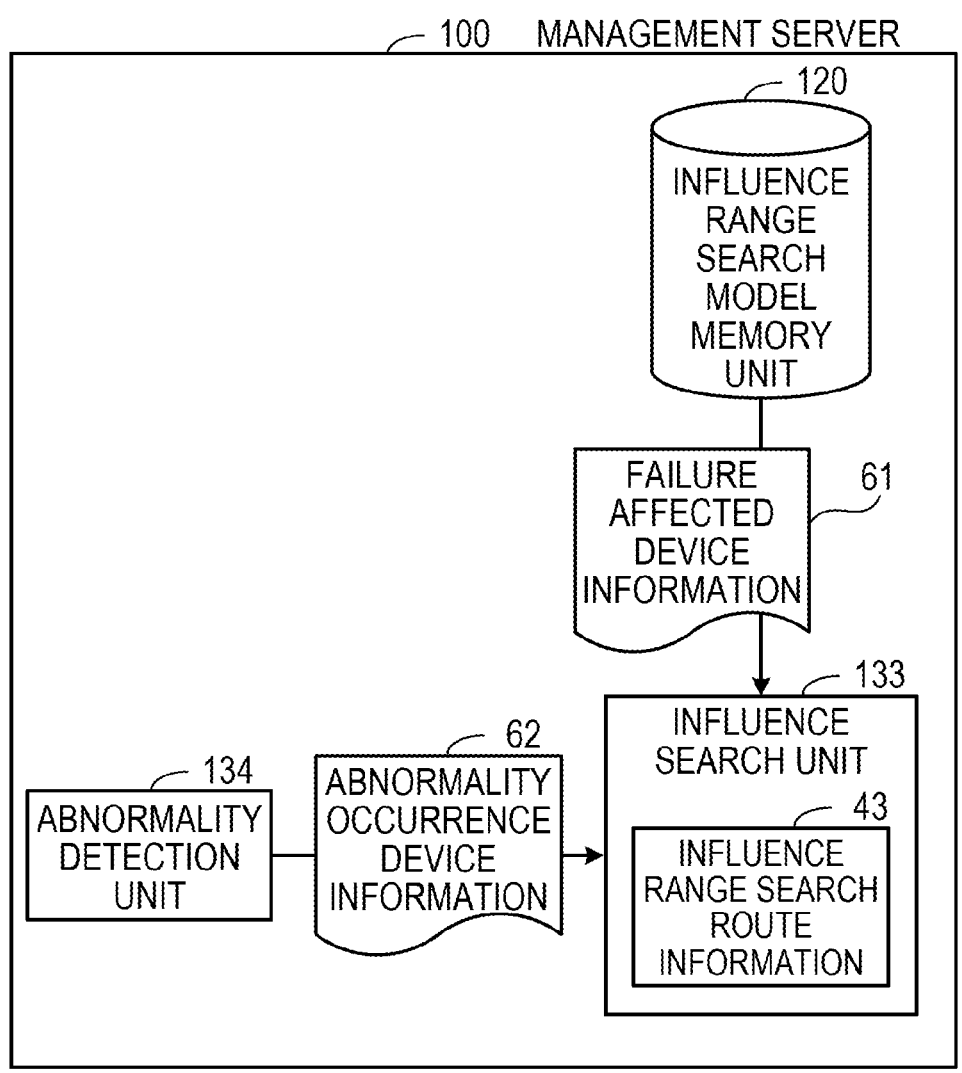
FIG. 26 is a diagram illustrating an example of influence range search.

FIG. 26 is a diagram illustrating an example of influence range search. The influence search unit 133 that receives the abnormality occurrence device information 62 from the abnormality detection unit 134 extracts the failure affected device information 61 from the influence range search model 121 in the influence range search model memory unit 120. In addition, the influence search unit 133 performs the abnormality influence range search processing starting from the abnormality occurrence device based on the search route indicated in the influence range search route information 43.

Figure 27:
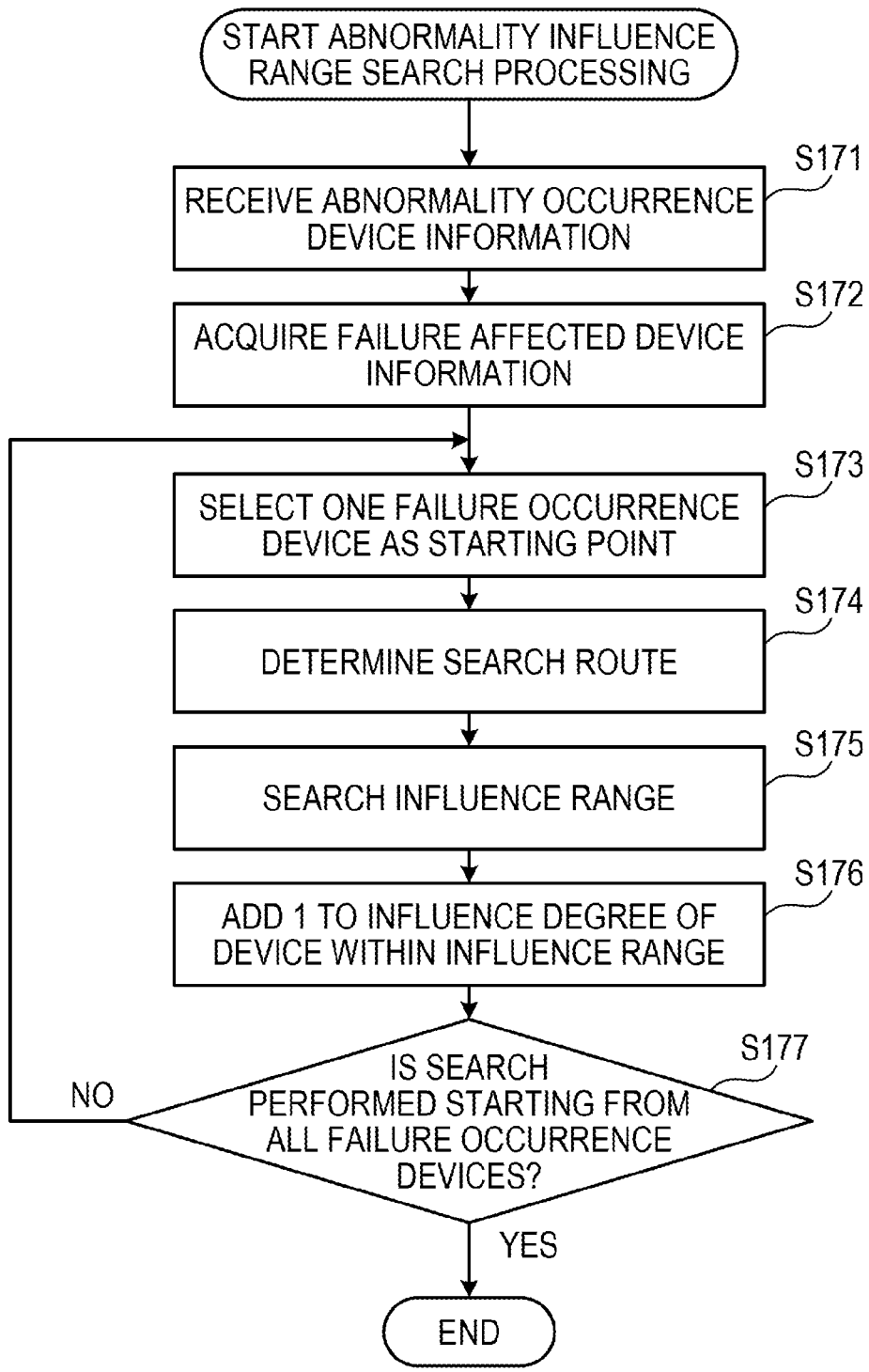
FIG. 27 is a flowchart illustrating an example of an abnormality influence range search processing order.

FIG. 27 is a flowchart illustrating an example of an abnormality influence range search processing order. Hereinafter, the processing illustrated in FIG. 27 will be described according to the step number.

(Step S171) The influence search unit 133 receives the abnormality occurrence device information 62.

(Step S172) The influence search unit 133 acquires the failure affected device information 61 from the influence range search model 121 in the influence range search model memory unit 120.

(Step S173) The influence search unit 133 selects one of the failure occurrence devices that are not yet selected among the failure occurrence devices indicated in the failure occurrence device information 62 as the failure occurrence device at the starting point.

(Step S174) The influence search unit 133 determines the search route for searching the influence range of the abnormality which occurs in the selected abnormality occurrence device based on the influence range search route information 43. For example, the influence search unit 133 acquires a search route number corresponding to the combination of the function of the selected abnormality occurrence device and the type of the failure acquired in step S142 (see FIG. 16) in the influence range search processing in the failure search route correspondence table 43a. In addition, the influence search unit 133 determines the search route in the search route information 43b corresponding to a specific search route number as the search route for searching the influence range of the abnormality which occurs in the selected abnormality occurrence device.

(Step S175) The influence search unit 133 searches the influence range from the failure occurrence device that is the starting point according to the determined search route.

(Step S176) The influence search unit 133 adds "1" to the influence degree of the device (the device other than the failure occurrence device on the route detected by the search) within the influence range in the influence range search model 121.

(Step S177) The influence search unit 133 determines whether the search using all failure occurrence devices as the starting point is completed. When searching all of the failure occurrence devices as the starting point is completed, the influence detection unit 133 terminates the abnormality influence range search processing. Further, when there is the failure occurrence device which is not searched, the influence search unit 133 makes the processing proceed to step S173.

As described above, the search of the influence range starting from the failure occurrence device is performed, and as a result, the influence degree of the failure affected device is updated.

Figure 28:
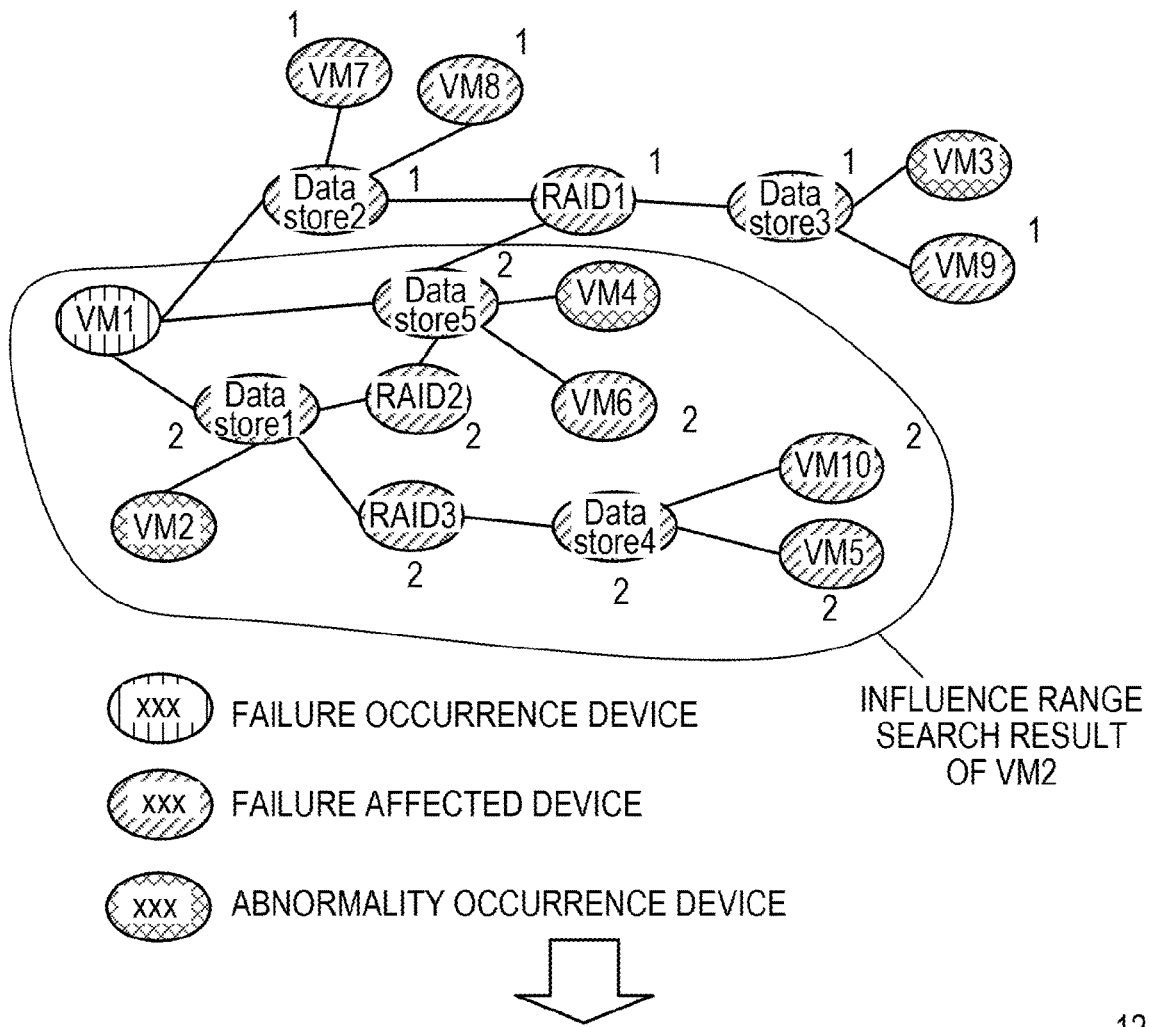
FIG. 28 is a first diagram illustrating an example of an abnormality influence range search result.

FIG. 28 is a first diagram illustrating an example of an abnormality influence range search result. In the example of FIG. 28, the result of searching the influence range is illustrated starting from the device "VM2". "1" is added to the influence degree of the failure affected device included in the search range in the search from the device "VM2" in the influence range search model 121.

Likewise, the search of the influence range starting from each of other abnormality occurrence devices "VM3" and "VM4" is also performed.

Figure 29:
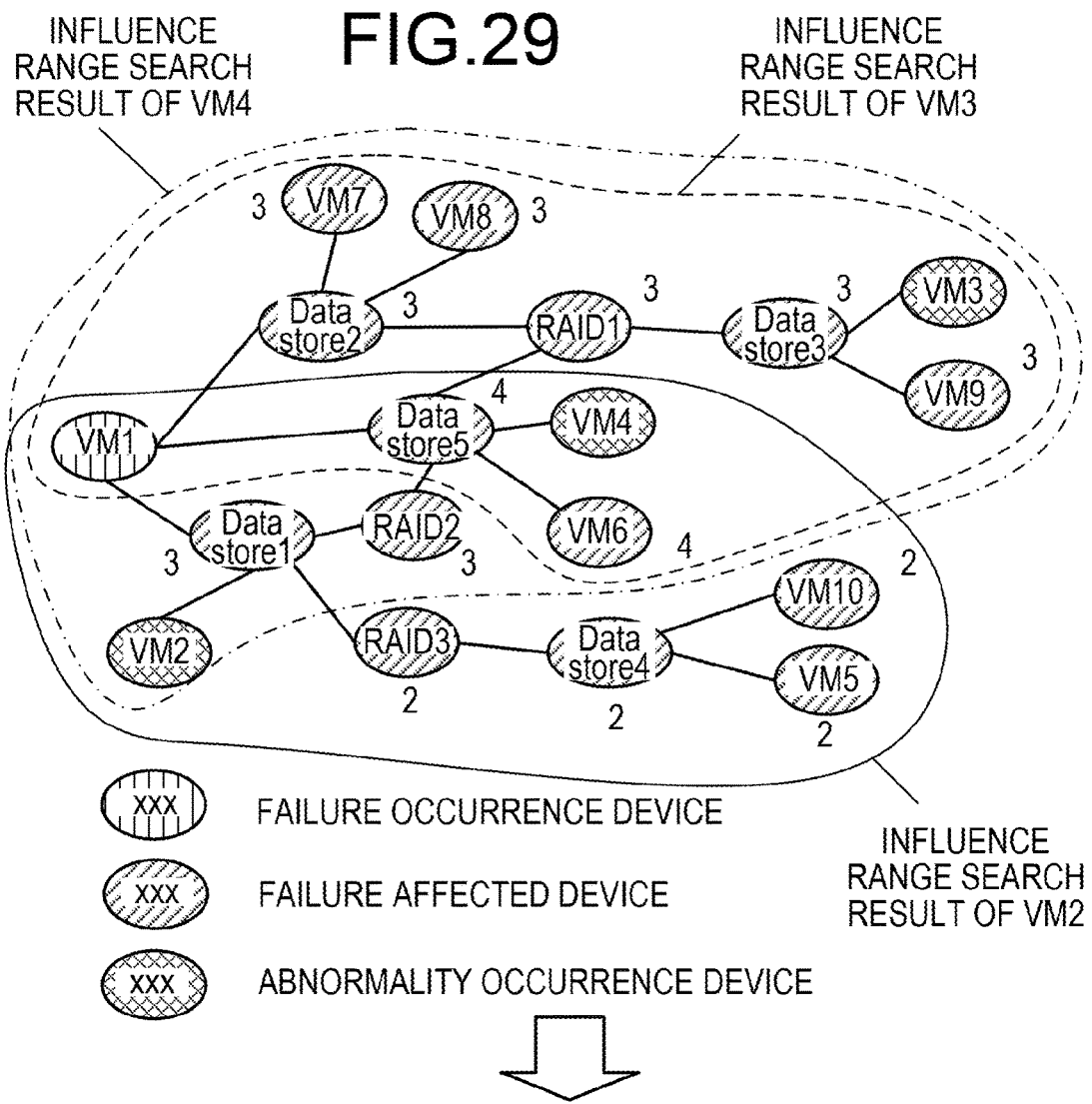
FIG. 29 is a second diagram illustrating an example of the abnormality influence range search result.

FIG. 29 is a second diagram illustrating an example of the abnormality influence range search result. FIG. 29 illustrates a state after completion of the search of the influence range starting from each of all of the abnormality occurrence devices. The influence degree of the failure affected device in the influence range search model 121 is counted up only for the number of times included in the influence range by the abnormal influence range search.

It may be estimated that there is a high possibility that the failure affected devices with a higher influence degree obtained as described above will be affected by the failure. Therefore, based on the influence degree of the failure affected device, ranking of the affected devices in the influence range is performed.

<Affected Device Ranking Processing>

Hereinafter, the affected device ranking processing will be described with reference to FIGS. 30 to 32.

Figure 30:
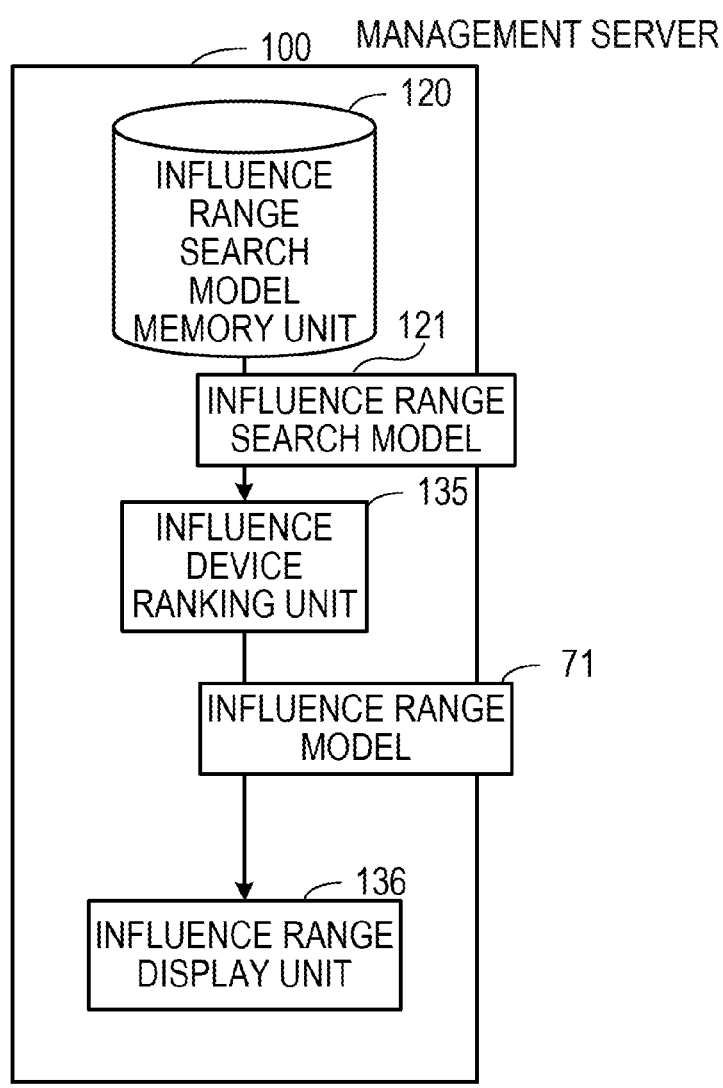
FIG. 30 is a diagram illustrating an example of influence device ranking processing.

FIG. 30 is a diagram illustrating an example of influence device ranking processing. The affected device ranking unit 135 acquires the influence range search model 121 in which the influence degree of the failure affected device is set from the influence range search model memory unit 120. In addition, the affected device ranking unit 135 performs ranking according to the influence degree for the failure affected device. For example, in that because the device having the high influence degree is in the influence range of many abnormality-occurrence devices, there is a high possibility that the device having the high influence degree will be affected by the failure which occurs, the affected device ranking unit 135 gives a high rank to the device having the high influence degree.

The affected device ranking unit 135 generates an influence range model 71 indicating the connection relationship between the devices within the influence range of the failure and the rank of the failure affected device. In addition, the affected device ranking unit 135 transmits the created influence range model 71 to the influence range display unit 136.

Figure 31:
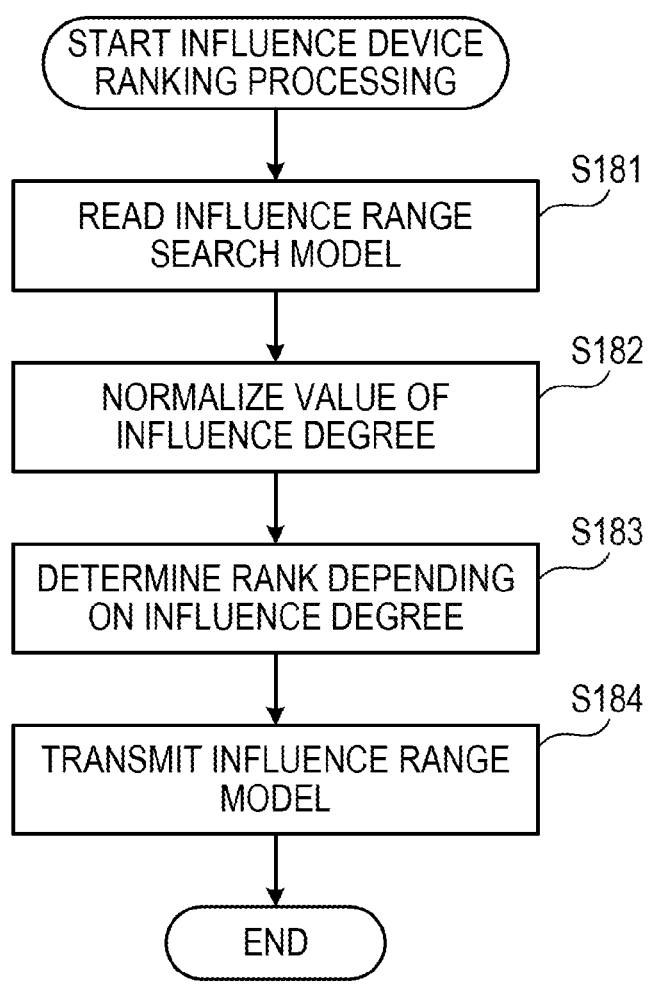
FIG. 31 is a flowchart illustrating an example of an influence device ranking processing order.

FIG. 31 is a flowchart illustrating an example of an influence device ranking processing order. Hereinafter, the processing illustrated in FIG. 31 will be described according to the step number.

(Step S181) The affected device ranking unit 135 reads the influence range search model 121 from the influence range search model memory unit 120.

(Step S182) The affected device ranking unit 135 normalizes the value of the influence degree. For example, the affected device ranking unit 135 divides the value of a failure degree by a total of the number ("1" in the example of FIG. 29) of failure occurrence devices and the number ("3" in the example of FIG. 29) of abnormality occurrence devices. A quotient obtained by dividing becomes a value after normalization of the influence degree.

(Step S183) The affected device ranking unit 135 determines the rank depending on the influence degree after the normalization. For example, the range of the influence degree corresponding to each rank is set in association with a plurality of ranks in advance with respect to the influence device ranking unit 135. In addition, the affected device ranking unit 135 determines the rank of the failure affected device depending on which rank the influence degree of each failure affected device belongs to a range corresponding to.

(Step S184) The affected device ranking unit 135 transmits the influence range model 71 indicating the rank of the failure affected device to the influence range display unit 136.

FIG. 32 is a diagram illustrating an example of an influence device ranking result. In the example of FIG. 32, the failure affected device having the influence degree of after the normalization larger than "0.8" and lower than "1" is set to "ranking 1". Further, the failure affected device having the influence degree after the normalization larger than "0.6" and equal to or lower than "0.8" is set to "ranking 2". Further, the failure affected device having the influence degree after the normalization equal to or larger than "0" and equal to or lower than "0.6" is set to "ranking 3". A numerical value indicating the rank indicates that the smaller the value, the higher the possibility of being affected by the failure. Among the failure affected devices illustrated in FIG. 32, the node indicating the failure affected device of "ranking 1" is represented by a thick solid line, the node indicating the failure affected device of "ranking 2" is represented by a thin solid line, and the node indicating the failure affected device of "ranking 3" is indicated by a dashed line.

The influence range model 71 indicating the rank of the failure affected device is created. The influence range model 71 includes, for example, device information and connection information. In the device information, the function, the device type, a score, and the rank of the device are set in association with the device name of the device within the influence range of the failure. The type of the device indicates whether the corresponding device is the failure occurrence device, the abnormality occurrence device, or the failure affected device. In the score, a value obtained by normalizing the influence degree is set. In the rank, a value indicating the rank determined according to the influence degree after the normalization is set. A list of devices directly connected on the network is set in the connection information.

In such a manner, the abnormality occurrence devices are ranked. In addition, the influence range display unit 136 displays the abnormality occurrence device within the influence range in such a display form to enable the rank of each abnormality occurrence device to be known.

<Influence Range Display Processing>

Hereinafter, the influence range display processing will be described with reference to FIGS. 33 to 35.

Figure 33:
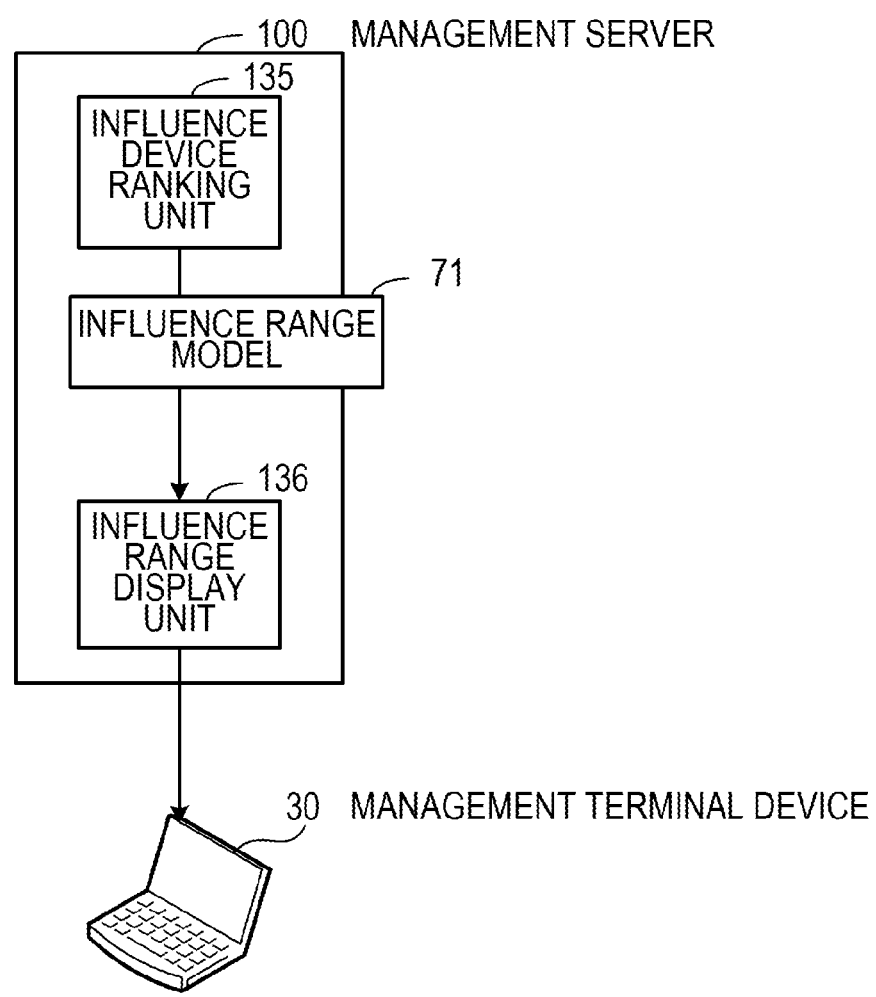
FIG. 33 is a diagram illustrating an example of influence range display processing.

FIG. 33 is a diagram illustrating an example of influence range display processing. The influence range display unit 136 receives the influence range model 71 transmitted from the affected device ranking unit 135. Then, the influence range display unit 136 displays on the management terminal device 30 the connection relationship between the devices indicated in the influence range model 71 as the graph. In that case, the influence range display unit 136 displays the nodes corresponding to the failure affected devices so as to visually recognize the rank according to the influence degree.

Figure 34:
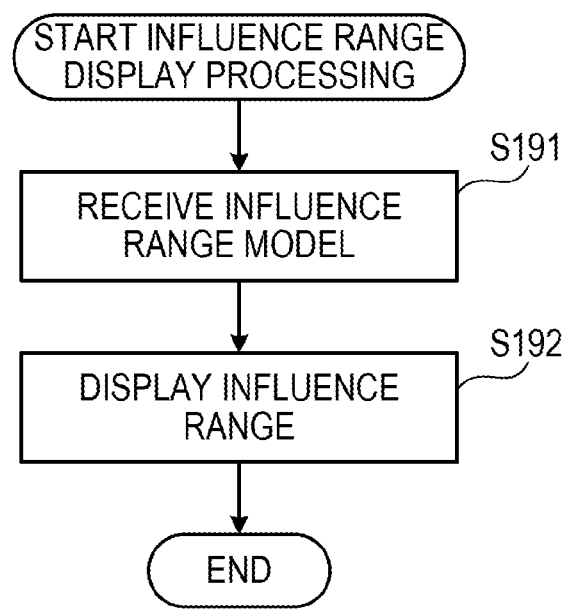
FIG. 34 is a flowchart illustrating an example of an influence range display processing order.

FIG. 34 is a flowchart illustrating an example of an influence range display processing order. Hereinafter, the processing illustrated in FIG. 34 will be described according to the step number.

(Step S191) The influence range display unit 136 receives the influence range model 71.

(Step S192) The influence range display unit 136 displays the influence range indicated in the influence range model 71 on the screen of the management terminal device 30.

Figure 35:
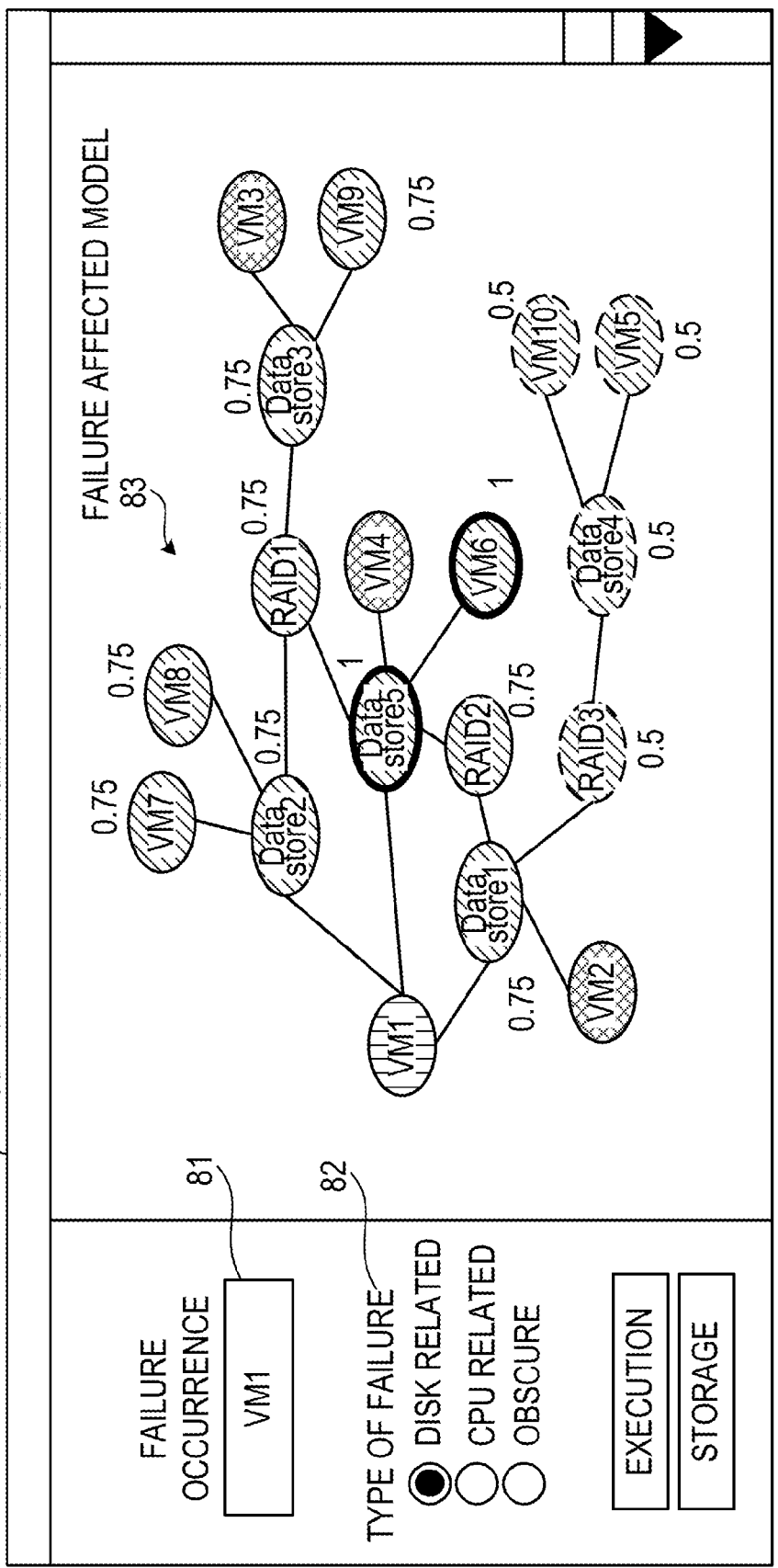
FIG. 35 is a diagram illustrating a display example of an influence range.

FIG. 35 is a diagram illustrating a display example of an influence range. On an influence range display screen 80, the name of the failure occurrence device (failure occurrence device name 81) or a failure type 82 is displayed. Further, on the influence range display screen 80, a failure affected model 83 is displayed in a graph form.

In the failure affected model 83, each device within the influence range is represented by the node and the connection relationship between the devices is represented by an edge (line connecting the nodes). Whether the device is the failure occurrence device, the abnormality occurrence device, or the failure affected device is represented by a difference (difference in a mesh dot in the example of FIG. 35) in a display mode of the corresponding node. Further, the rank of the failure affected devices is represented by the difference (in the example of FIG. 35, the difference in type of border line) in the display mode of the corresponding node. In the vicinity of the node corresponding to the failure affected device, a value indicating the influence degree after the normalization of the failure affected device is displayed.

By performing such display processing of the influence range, the operator may easily recognize the device in which the possibility of being affected by the failure is high. As a result, the device which is highly likely to be affected by the failure is first set as a target of a recovery operation of the failure to efficiently perform the recovery operation.

When a plurality of failure occurrence devices is detected, the influence ranges of the plurality of failure occurrence devices are superimposed to calculate the score of the failure affected device with higher accuracy. Hereinafter, with reference to FIGS. 36 and 37, an example of calculating the score when the plurality of failure occurrence devices is detected will be described.

FIG. 36 is a diagram illustrating a score calculation example of superimposing the influence ranges of a plurality of failure occurrence devices. In the example of FIG. 36, the failure occurs in two devices 201 and 208 out of the devices 201 to 217. Therefore, the influence range of the failure which occurs in each of the devices 201 and 208 is searched. The influence range of the failure of the device 201 includes the devices 202 to 208 and 211 to 217. The influence range of the failure of the device 208 includes the devices 202 to 210. In addition, the score is calculated by superimposing the influence range of the failure. As a result, the scores of the devices 202 to 207 included in both influence ranges are "2" and the scores of the other devices 209 to 217 are "1".

FIG. 37 is a diagram illustrating the score calculation example of superimposing the influence range of the abnormality occurrence device with the influence ranges of the plurality of failure occurrence devices. In the example of FIG. 37, the abnormality is detected in the device 211. Therefore, the influence range of the abnormality which occurs in the device 211 is searched within the influence range of the failure illustrated in FIG. 36. In the example of FIG. 37, the influence range of the abnormality which occurs in the device 211 includes the devices 202, 203, 206, 207, 212, 214, and 215. In addition, the score is calculated by superimposing the influence range of the abnormality of the device 211 in the influence range of the failure illustrated in FIG. 36. As a result, the scores of the devices 202, 203, 206, and 207 are "3", the scores of the devices 204, 205, 209, 210, 212, 214, and 215 are "2", and the scores of the devices 213, 216, and 217 are "1".

In such a manner, as the number of detected failure occurrence devices increases, the number of superimposing times of the influence range of the failure and the abnormality increases, and as a result, a maximum value of the score also increases. By ranking the order of the failure affected devices by using such scores, it is possible to rank the failure affected devices in multiple stages, thereby more efficiently performing the recovery operation of the failure.

Other Embodiments

Although the embodiments are exemplified above, the configuration of each unit described in the embodiment may be replaced with another one having the same function. Further, any other components or processes may be added. In addition, any two or more configurations (features) of the above-described embodiments may be combined.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program that causes a computer to execute a process, the process comprising:
   specifying, by the computer, a first device in which a failure occurs among a plurality of devices included in a network based on failure occurrence information;
   searching, by the computer, for second devices of the plurality of devices by tracing a connection relationship among the plurality of devices indicated by a system configuration model in accordance with search information indicating a search order of the connection relationship starting from the first device, the second devices existing in a first influence range which starts from the first device and is likely to be affected by the failure, and the search order corresponding to a combination of a function of the first device and a type of the failure;
   first determining, by the computer, whether a third device exists among the second devices, the third device having abnormality due to the failure of the first device, the abnormality detected by the computer by executing a process of:
      determining a difference between a numerical value indicating an operational state of the third device during a period in which the failure occurred and a predetermined past time period, the operational state being one of a central processing unit (CPU) usage rate, a time change of a memory usage rate, and a time change of a write count per unit time of a disk;
      determining whether the difference is equal to or larger than a threshold; and
      determining that the abnormality exists when a determination is made that the difference is equal to or larger than the threshold;
   second determining, by the computer, whether each of the second devices other than the third device exists in a second influence range starting from the third device based on the connection relationship among the second devices, the second influence range being likely to be affected by the abnormality of the third device and being different from the first influence range;
   assigning, by the computer, a rank of a degree of a possibility of being affected by the failure with respect to each of the second devices other than the third device based on a result of the second determining; and
   outputting, by the computer, rank information indicating the rank assigned in the assigning on a display.

2. The non-transitory computer readable recording medium according to claim 1, the process further comprising:
   when a plurality of third devices that have abnormality due to the failure of the first device exist, third determining, by the computer, whether each of the second devices other than the plurality of third devices exists in a plurality of second influence ranges starting from each of the plurality of third devices based on the connection relationship among the second devices, the plurality of second influence ranges being likely to be affected by the abnormality of the plurality of third devices, respectively; and
   assigning, by the computer, a higher rank to one of the second devices, the one of the second devices being determined to exist in the plurality of second influence ranges a higher number of times.

3. The non-transitory computer readable recording medium according to claim 1, the second determining comprising tracing, by the computer, the connection relationship among the plurality of devices starting from the third device in accordance with search information indicating a search order of the connection relationship starting from the third device, the search order corresponding to a combination of a function of the third device and the type of the abnormality.

4. The non-transitory computer readable recording medium according to claim 1, the first determining comprising comparing, by the computer, an operational state of the second devices in a time zone including an occurrence time of the failure of the first device and an operational state of the second devices in a past predetermined time zone.

5. An influence range identification method, comprising:
   specifying, by a computer, a first device in which a failure occurs among a plurality of devices included in a network based on failure occurrence information;
   searching, by the computer, for second devices of the plurality of devices by tracing a connection relationship among the plurality of devices indicated by a system configuration model in accordance with search information indicating a search order of the connection relationship starting from the first device, the second devices existing in a first influence range which starts from the first device and is likely to be affected by the failure, and the search order corresponding to a combination of a function of the first device and a type of the failure;
   first determining, by the computer, whether a third device exists among the second devices, the third device having abnormality due to the failure of the first device, the abnormality detected by the computer by executing a process of:
      determining a difference between a numerical value indicating an operational state of the third device during a period in which the failure occurred and a predetermined past time period, the operational state being one of a central processing unit (CPU) usage rate, a time change of a memory usage rate, and a time change of a write count per unit time of a disk;

determining whether the difference is equal to or larger than a threshold; and determining that the abnormality exists when a determination is made that the difference is equal to or larger than the threshold;

second determining, by the computer, whether each of the second devices other than the third device exists in a second influence range starting from the third device based on the connection relationship among the second devices, the second influence range being likely to be affected by the abnormality of the third device and being different from the first influence range;

assigning, by the computer, a rank of a degree of a possibility of being affected by the failure with respect to each of the second devices other than the third device based on a result of the second determining; and outputting, by the computer, rank information indicating the rank assigned in the assigning on a display.

6. An influence range identification apparatus, comprising:

a memory; and a processor coupled to the memory and the processor configured to:

specify a first device in which a failure occurs among a plurality of devices included in a network based on failure occurrence information;

search for second devices of the plurality of devices by tracing a connection relationship among the plurality of devices indicated by a system configuration model in accordance with search information indicating a search order of the connection relationship starting from the first device, the second devices existing in a first influence range which starts from the first device and is likely to be affected by the failure, and the search order corresponding to a combination of a function of the first device and a type of the failure;

first determine whether a third device exists among the second devices, the third device having abnormality due to the failure of the first device, the abnormality detected by the computer by executing a process of:

determining a difference between a numerical value indicating an operational state of the third device during a period in which the failure occurred and a predetermined past time period, the operational state being one of a central processing unit (CPU) usage rate, a time change of a memory usage rate, and a time change of a write count per unit time of a disk;

determining whether the difference is equal to or larger than a threshold; and determining that the abnormality exists when a determination is made that the difference is equal to or larger than the threshold;

second determine whether each of the second devices other than the third device exists in a second influence range starting from the third device based on the connection relationship among the second devices, the second influence range being likely to be affected by the abnormality of the third device and being different from the first influence range;

assign a rank of a degree of a possibility of being affected by the failure with respect to each of the second devices other than the third device based on a result of the second determination; and output rank information indicating the assigned rank on a display.

* * * * *